(12) United States Patent
Tore

(10) Patent No.: US 6,310,926 B1
(45) Date of Patent: Oct. 30, 2001

(54) ADJUSTMENT OF THE SAMPLING FREQUENCY IN A MULTICARRIER RECEIVER

(75) Inventor: Mikael André Tore, Älsvjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/531,336

(22) Filed: Mar. 20, 2000

Related U.S. Application Data

(63) Continuation of application No. PCT/EP98/06132, filed on Sep. 25, 1998.

(51) Int. Cl.[7] .................................................. H04L 7/00
(52) U.S. Cl. ................................. 375/355; 375/261
(58) Field of Search ............................. 375/355, 261, 375/316, 324, 344

(56) References Cited

U.S. PATENT DOCUMENTS

| | | |
|---|---|---|
| 5,497,398 | 3/1996 | Tzannes et al. . |
| 5,519,730 | 5/1996 | Jasper et al. . |
| 5,754,592 * | 5/1998 | Flowers et al. ........................ 375/243 |
| 5,802,117 * | 9/1998 | Ghosh ................................. 375/344 |

FOREIGN PATENT DOCUMENTS

| | | |
|---|---|---|
| 0 656 706 A2 | 6/1995 | (EP) . |
| 0 683 576 A1 | 11/1995 | (EP) . |
| 0 693 830 A2 | 1/1996 | (EP) . |
| 0 709 980 A1 | 5/1996 | (EP) . |
| 0 730 357 A2 | 9/1996 | (EP) . |
| 0 794 634 A2 | 9/1997 | (EP) . |
| 95/19671 | 7/1995 | (WO) . |
| 95/20848 | 8/1995 | (WO) . |
| 96/00472 | 1/1996 | (WO) . |

\* cited by examiner

Primary Examiner—Temesghen Ghebretinsae
(74) Attorney, Agent, or Firm—Nixon & Vanderhye P.C.

(57) ABSTRACT

In a multicarrier QAM system, a receiver comprises a data directed phase error estimator which determines a phase rotation direction of each received complex QAM data value ($Y_k$) with respect to the complex default QAM data value C(k) used by a quantizer/decoder for decoding. The data directed phase error estimator averages the phase rotation directions for all carriers and adjusts the phase of a sample frequency ($f_{sampR}$) output by a numerically-controlled oscillator on the basis of this overall average phase rotation direction value (D). Thus, an overall estimate of the missing phase synchronization to the sample frequency used in the transmitter can be obtained such that the data symbols can be more accurately decoded.

37 Claims, 16 Drawing Sheets

Basic multicarrier QAM system

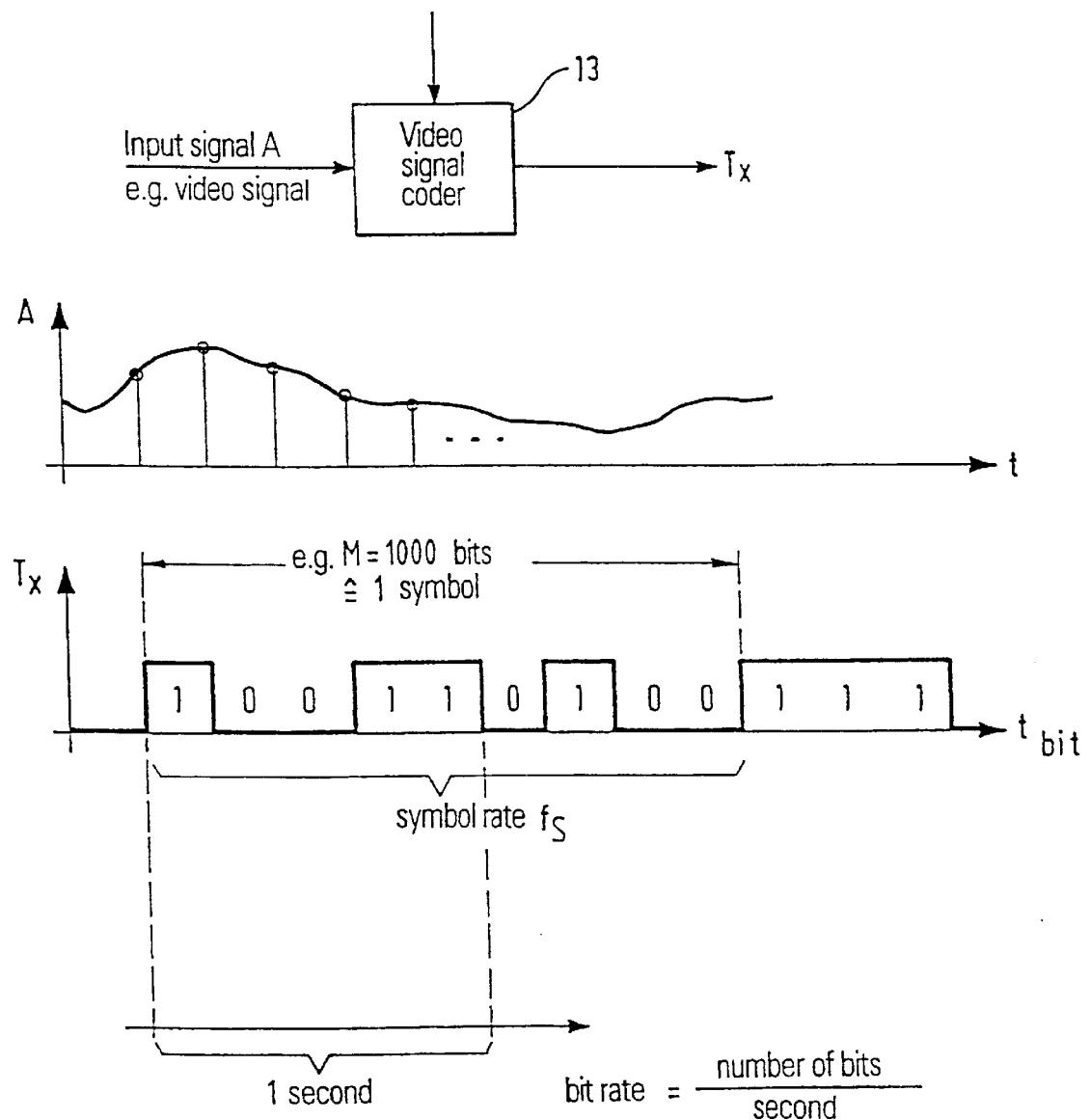

4 different signal points of one carrier transmitted $C_k$ ($C_{11}$)

+ positive phase error
− negative phase error
O no phase error

Fig. 12 - 1

|  | $c_K$ | $y_K$ | $e_K$ |
|---|---|---|---|
| CASE A | $\vec{e}_{00} = (+1) -$ $\vec{e}'_{00} = (+1) -$ | $(\frac{1}{\sqrt{2}} + j\frac{1}{\sqrt{2}}) =$ $(+1 + j)$ | $\frac{\sqrt{2}-1}{\sqrt{2}} - j\frac{1}{\sqrt{2}} =$ $+0{,}41 - j\frac{1}{\sqrt{2}}$ $+1 - j$ |
| CASE B | $\vec{e}_{10} = (-1) -$ $\vec{e}'_{10} = (-1) -$ | $(-0{,}9 + j\,0{,}1) =$ $(-1 + j)$ | $-0{,}1 - j\,0{,}1$ $-1 - j$ |
| CASE C | $\vec{e}_{11} = (-j) -$ $\vec{e}'_{11} = (-j) -$ | $(-\frac{1}{\sqrt{2}} - j\frac{1}{\sqrt{2}}) =$ $(-1 - j) =$ | $+\frac{1}{\sqrt{2}} - j\frac{\sqrt{2}}{\sqrt{2}} + j\frac{1}{\sqrt{2}} =$ $+\frac{1}{\sqrt{2}} + j\frac{1-\sqrt{2}}{\sqrt{2}} =$ $+\frac{1}{\sqrt{2}} - j\,0{,}41$ $+1 - j$ |

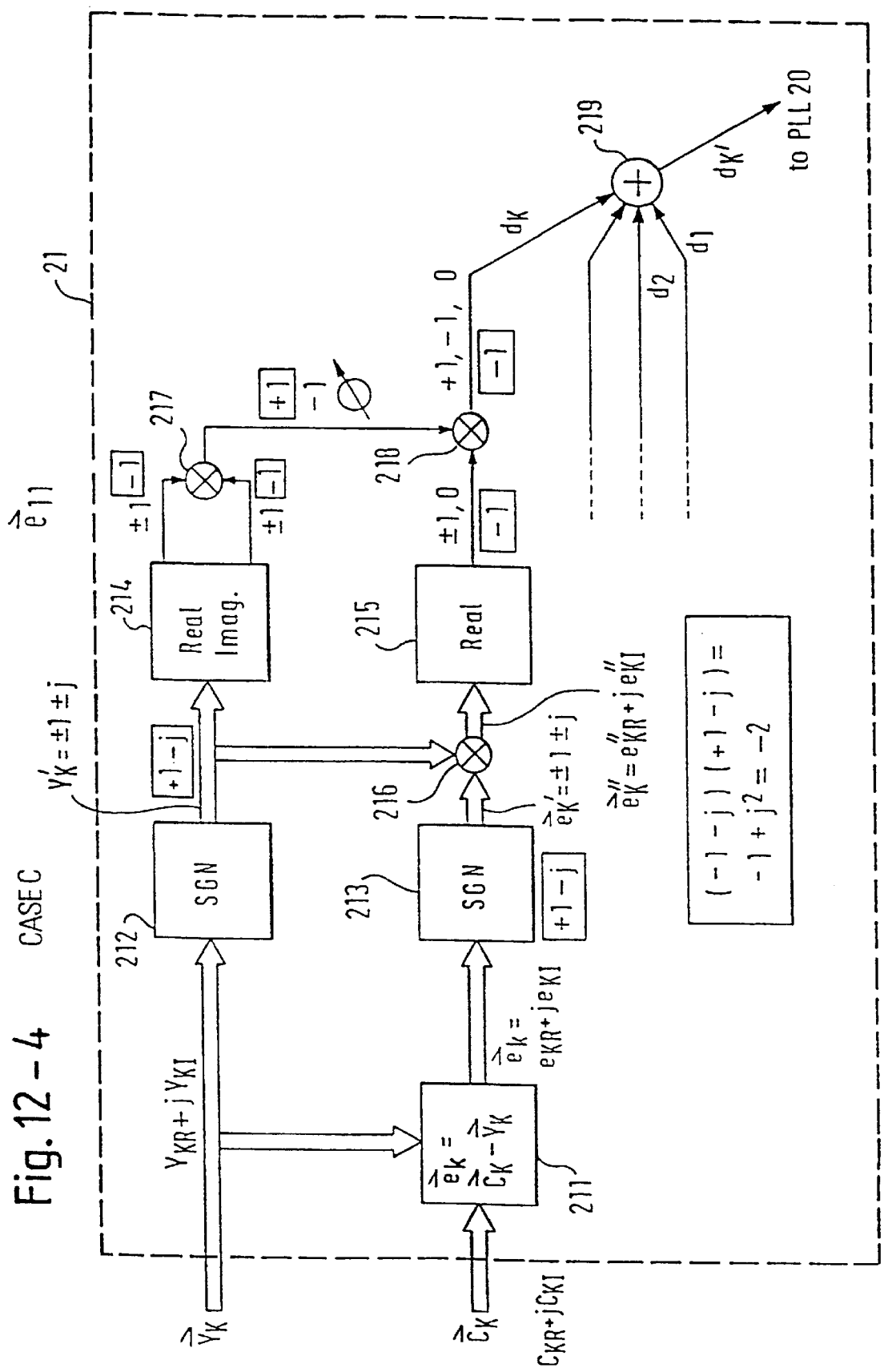
Fig. 12-4 CASE C

Fig. 14

|  | 214, 217 | | 215 | | 218 |
|---|---|---|---|---|---|
|  | Sign of Quadrant | | Sign of error | | Direction |
|  | Imag. part of $Y'_K$ | Real part of $Y'_K$ | Imag. part of $e''_K$ | Real part of $e''_K$ | $d_K$ |
| CASE A | 0 (+j) | 0 (+1) | 0 (+j) | 0 (+1) | 00 ( 0 ) |
|  | 0 (+j) | 0 (+1) | 0 (+j) | 1 (−1) | 11 (−1) |
|  | 0 (+j) | 0 (+1) | 1 (−j) | 0 (+1) | 01 (+1) |
| CASE B | 0 (+j) | 0 (−1) | 1 (−j) | 1 (−1) | 00 ( 0 ) |
|  | 0 (+j) | 1 (−1) | 0 (−j) | 0 (+1) | 11 (−1) |
|  | 0 (+j) | 1 (−1) | 0 (+j) | 1 (−1) | 00 ( 0 ) |
|  | 0 (+j) | 1 (−1) | 1 (−j) | 0 (+1) | 00 ( 0 ) |
|  | 0 (+j) | 1 (−1) | 1 (−j) | 1 (−1) | 01 (+1) |
|  | 1 (−j) | 0 (+1) | 0 (+j) | 0 (+1) | 01 (+1) |
|  | 1 (−j) | 0 (+1) | 0 (+j) | 1 (−1) | 00 ( 0 ) |
|  | 1 (−j) | 0 (+1) | 1 (−j) | 0 (+1) | 00 ( 0 ) |
|  | 1 (−j) | 0 (+1) | 1 (−j) | 1 (−1) | 11 (−1) |
|  | 1 (−j) | 1 (−1) | 0 (+j) | 0 (+1) | 00 ( 0 ) |
| CASE C | 1 (−j) | 1 (−1) | 0 (+j) | 1 (−1) | 11 (−1) |
|  | 1 (−j) | 1 (−1) | 1 (−j) | 0 (+1) | 01 (+1) |
|  | 1 (−j) | 1 (−1) | 1 (−j) | 1 (−1) | 00 ( 0 ) |

ADJUSTMENT OF THE SAMPLING FREQUENCY IN A MULTICARRIER RECEIVER

This is a continuation of PCT application PCT/EP98/06132, filed Sep. 25, 1998, the entire content of which is hereby incorporated by reference in this application.

FIELD OF THE INVENTION

The invention generally relates to a multicarrier QAM system and a QAM receiver as well as a method for receiving and demodulating an analog multicarrier QAM signal into a digital output signal consisting of successive bits. In particular, the invention relates to the adjustment of a phase of a sample frequency at the receiver side of the multicarrier QAM system. A receiver, a multicarrier QAM communication system for transmitting information and a method according to the preamble of claims 1, 16, 27 is known from EP 0 656 706 A2. Here, explicitly the phase shift value of each QAM value is determined and the timing is adjusted on the basis of the explicitly determined phase shift value. An adjustment of the timing merely on the basis of the an averaged direction value as in the present invention is not performed here.

Multicarrier QAM Systems

Multicarrier QAM systems are widely used in general switched telephone networks, cellular radio technology and transmissions between individual modems using DMT or OFTM (DMT: discrete multi-tone modulation; OFTM: orthogonal frequency division multiplexing). Generally, multicarrier QAM transmission has advantages over single-carrier transmission, e.g. that a multicarrier QAM signal can be processed in a receiver with little noise or interference which is e.g. caused by linear equalization of a single-carrier signal, and secondly that the long symbol time used in the multicarrier QAM transmission produces a much greater immunity to pulse noise and fast fading effects.

On the other hand, the recovery of the sample rate with a correct phase and the recovery of the symbol rate and its start position from the received analog multicarrier QAM signal at the receiver must be very accurate to not cause a wrong decoding of the data.

BACKGROUND OF THE INVENTION

The background of multicarrier modulation/demodulation of data will first be explained wish reference to the attached FIG. 1 to 4. A general review article, which describes such basic aspects and which relates to the preamble of the attached claims 1, 14, 23, is published in IEEE Communications Magazine, May 1990, pages 6 to 14, "Multicarrier Modulation for Data Transmission: An Idea Whose Time Has Come" by John A. C. Bingham.

Multicarrier Modulation

As shown in FIG. 1, input data $T_x$ at $Mf_s$ bits per second are grouped into blocks of M bits at a block ("symbol") rate of $f_s$. As shown in FIG. 3, the input data $T_x$ may e.g. be obtained from a video signal coder 13, generally as bits from a data source. The successive bits of the input data $T_x$ have a certain bit rate, i.e. a certain number of bits per second. As also shown in FIG. 3, a block of bits M correspond to one symbol in the multicarrier transmission technology. In a serial-to-parallel converter 1, the input data $T_x$ is grouped into groups of $m_1$ bits, $m_2$ bits, ..., $m_n$ bits. In a modulator 2, $m_n$ bits for the carrier at $f_{c,n}$ are used to modulate $N_c$ carriers, which are spaced $\Delta f$ apart across any usable frequency band. That is $$f_{c,n} = n\, \Delta f \text{ for } n = n_1 \text{ to } n_2 \qquad (1)$$

and $$M = \sum_{n=n_1}^{n_2} m_n$$

with $$N_c = n_2 - n_1 + 1,$$

$\Delta f$: carrier spacing,
$n_1$: lowest index of carriers,
$n_2$: highest index of carriers,
$N_c$: total number of carriers considered.

The carriers which have been modulated by the individual bits are summed for transmission on a transmission line TM and must in principle be separated in the receiver before demodulation. As will be seen in the following, a separation and demodulation can be done at the same time using an FFT.

Multicarrier Demodulation

Multicarrier demodulation techniques conventionally used are described in the above prior art document. Nowadays, most systems will use a demodulation method where the carriers are "keyed" by the data using the so-called quadrature amplitude shift keying (QAM). The individual spectra are now sinc functions and are not band-limited. The separation is then carried out by baseband processing and not by bandpass filtering which leads to the advantage that both the transmitter and the receiver can be implemented using efficient Fast Fourier Transform (FFT) techniques.

QAM System Using Fast Fourier Transforms

FIG. 2 shows such a basic multicarrier QAM system using Fast Fourier Transforms in the means 4, 10 at the transmitter and receiver side. Modulation is performed on M bits (symbol or block) of data at a time—preferably using an inverse FFT (FFT$^{-1}$)—and samples of the transmitted signal on the transmission line TM (an analog signal) are generated at the sampling rate $f_{sampT}$ in the digital/analog converter 5. For greatest efficiency, $f_{sampT}$ should be equal to $\Delta f$ multiplied by an integer power of 2.

If $f_{samp} = 2 * N_{tot} * \Delta f$, then $N_{tot}$ carriers are available for modulation, but the channel will usually be such that only $N_c$ ($N_c < N_{tot}$) carriers can be used. If these are at frequencies $n_1 \Delta f$ to $n_2 \Delta f$, as defined in the above equation (1), modulation of a total of M bits, $m_n$ at a time, is most easily accomplished by calculating $N_c$ complex numbers (each selected from a constellation with $2^{m_n}$ points), augmenting them with $n_1 - 1$ zeros in front and $N_{tot} - n_2$ zeros behind and performing a FFT$^{-1}$ using $N_{tot}$ points. Thus, the modulation via FFT$^{-1}$ is equivalent to a multicarrier QAM in which the fundamental baseband pulse shape is a rectangle.

In the receiver 7–12, the received analog signal is demodulated by assembling $N_{tot}$ samples into a block and performing a real-to-complex FFT in the means 10. This is equivalent to demodulating each subband separately and then doing an integrate-and-dump procedure on each product.

That is, after the serial-to-parallel conversion in the converter 1, the encoder 3 generates a plurality of complex values whose number corresponds to the number of carriers used in the multicarrier system. The shift keying is then essentially performed by the $FFT^{-1}$ in the means 4 to result in a number of separate real sample values. The digital/analog converter 5 composes these digital samples into the analog transmission signal using a predetermined sample rate or sample frequency $f_{sampT}$.

The demodulation at the receiver 7–12 is completely analogous to the modulation in the transmitter 1–6. The analog signal is converted into digital samples using the analog/digital converter 8 employing a sample rate $f_{sampR}$. The digital samples are then applied to the serial-to-parallel buffer 9 which outputs these values to the FFT means 10 that performs the real-to-complex FFT transform. In the output of the FFT 10, one finds $N_{CR}$ complex values that should ideally be identical to those input to the $FFT^{-1}$ means 4 in the transmitter. The decoder 11 and the parallel-to-serial buffer 12 carry out a respective inverse operation as the parts 1, 3 in the transmitter to yield a digital output signal $R_x$ consisting of successive bits which should correspond to the input bitstream $T_x$.

Decoding the Complex QAM Data Values

FIG. 4 shows the complex QAM data values $Y_{00}$, $Y_{01}$, $Y_{10}$, $Y_{11}$ of the digital frequency domain multicarrier QAM signal output by the FFT means 10 in the receiver. As an example, FIG. 4 shows the situation using one carrier transmitting two bits. Also shown in FIG. 4 are the complex default QAM data values $C_{00}$, $C_{01}$, $C_{10}$, $C_{11}$ which were actually transmitted from the transmitter. As can be seen, the transmitted data symbols $C_k$ do not necessarily coincide with the received data symbols $Y_k$ in the complex plane. Such deviation is primarily caused by the fact that the symbol rate and/or the sample rate cannot be fully synchronized to each other in the transmitter and the receiver. Furthermore, there are distortions on the transmission line TM (i.e. the transmission channel)

However, the transmitted data symbols 00, 01, 10, 11 can still be decoded because the decoder 11 will estimate or select as received data symbol the carrier data symbol which lies closest to it in the complex plane. Normally, quadratic constellations are used for this and the real and imaginary parts of $C_K$ (known to the receiver as ideal data symbols) and of $Y_K$ (the output from the FFT means 10) are compared. The circles in FIG. 4 schematically show this selection or estimation process such that it is determined that $Y_{00}$ is the data symbol 00, $Y_{01}$ is the data symbol 01, $Y_{10}$ is the symbol 10 and $Y_{11}$ is the symbol 11. As is also seen in FIG. 4, the position of the complex QAM data values $Y_K$ may be deviated from the exact ones in a positive or negative direction as a result of the missing synchronization between the transmitter and receiver.

Conventional Timing Recovery

As already explained above, the incorrect positioning of the complex QAM data values in the complex plane in the output from the FFT means 10 in the receiver 7–12 is caused by the incorrect synchronization or the sample rate and the symbol rate.

The timing recovery can be separated in two problems. Firstly, the sample rate in the receiver must be the same as the one in the transmitter. That is, the transmitter must use the same sample frequency and therefore the receiver must recover the sample rate. The sample frequency is generated in a Numerically-Controlled Oscillator NCO, as may be taken from FIG. 5. Usually, the Numerically-Controlled Oscillator NCO 15 is contained in a phase-locked loop PLL. The timing recovery circuitry of FIG. 5 can be envisaged between nodes ①, ② in FIG. 2.

The second problem is to recover the symbol position and this only has to be done once if the sample clock is phase-locked as there is a known relationship between sample rates and symbol rates (e.g., one symbol can consist of 512 samples and according to the Nyquist theorem, 256 carriers are used for this; additionally it is known that the 512 samples modulate e.g. 1000 bits, such that the relationship between the sample rate and the symbol rate is established). Only the symbol position is unknown.

In FIG. 5, a time domain phase detector 14 is used for controlling the Numerically-Controlled Oscillator NCO to produce the desired receiver sample frequency $f_{sampR}$ when the switches S1, S2 are opened. Since the signal has not undergone the FFT 10 as yet, only a time-domain phase detection can be carried out with the switches S1, S2 being open.

Time Domain Sample Rate Recovery using Pilot Tone

One way of extracting the sample rate is to use a pilot tone in the time domain. When in FIG. 5 the switches S1, S2 are open, the sample rate is recovered from a single pilot tone of known frequency and phase, by resampling the received signal once per period of the known pilot tone (receiver training at start-up using only the pilot tone) The samples are then used directly to control the PLL comprising the Numerically-Controlled Oscillator 15 such that the sample frequency itself has been recovered from the transmission of a known pilot tone.

Frequency Domain Chase Adjustment using a Pilot Tone

When the switches S1, S2 in FIG. 5 are closed, then a phase adjustment can be performed with a frequency domain phase detector. The functioning of this frequency domain phase detector 16 using the pilot tone is further illustrated in FIG. 6. Again, FIG. 6 may be seen as replacing the parts between nodes ① to ③ in FIG. 2.

In FIG. 6, the timing recovery is changed to use only the FFT output with respect to the pilot tone transmitted without or together with the data. In FIG. 6, only one complex number corresponding to the frequency of the pilot tone is extracted as is shown in the little diagram in FIG. 6. If this frequency has a phase deviation, then the wrong phase of the receiver sampling rate can be determined by extracting only the real part of the received complex number corresponding to the pilot tone (in FIG. 6, it is assumed that the transmitted pilot tone has a phase of +j) That is, the real part indicates the phase deviation and the phase of the sampling rate $f_{sampR}$ of the numerically-controlled oscillator NCO can be controlled dependent on this extracted real part.

Furthermore, as is shown in FIG. 6, an equalizer 17 may be provided in order to compensate for phase and amplitude errors caused by the line TM in the values output in the frequency domain from the FFT means 10 (that is, the equalizer EQ can perform a rotation of each complex value output from the FFT 10 or it can respectively multiply the complex values by a certain number). Thus, by individually looking at each complex QAM data value $Y_K$, the equalizer EQ performs an equalization of the individual carriers separately. The equalizer can thus rotate the individual complex QAM data values and/or change their amplitudes. Actually, the equalizer 17 provides a number of coefficients to be multiplied with the output of the FFT.

A multicarrier QAM system using such an estimated pilot reference is known from U.S. Pat. No. 5,519,730. Another method for improving the accuracy of the received digital data symbols is known from U.S. Pat. No. 5,497,398 which uses an improved transformation technique for the time domain/frequency domain conversion in the transmitter and receiver.

EP 0 693 830 A2 describes a CDMA mobile communication system and a detection method where a transmission is performed by carrying out a quadrature multiplexing of a pilot signal and a data signal having I and Q components spread by the spectrum. The receiver contains a despreading circuit for despreading the quadrature multiplexed reception signals by using despreading codes for the pilot symbol and for despreading the reception signals by using spreading codes for the data symbols.

SUMMARY OF THE INVENTION

As explained above, the time domain sample rate recovery and the pilot tone frequency domain phase adjustment suffer from the disadvantage that the phase adjustment of the sample rate is still rather inaccurate, since the equalizer 17 only uses one pilot tone for adjusting the complex QAM values. Therefore, the equalizer only performs an adaptation of the individual complex values output by the FFT means 10 whilst the phase of the numerically-controlled oscillator (the phase-locked loop PLL) can only be controlled on the basis of the single real part of the single pilot tone. This still gives no accurate phase recovery, since the adjustment is intrinsically based on a single pilot tone.

Therefore, the object of the present invention is to provide a receiver of a multicarrier QAM system, a multicarrier QAM system and a method for demodulating an analog multicarrier QAM signal into a digital output signal, such that the decoded data symbols in the receiver coincide with the sent data symbols from the transmitter very accurately.

Solution of the Object

This object is solved by a receiver of a multicarrier QAM system for receiving and demodulating an analog multicarrier QAM signal into a digital output signal consisting of successive bits, comprising:
a) analog/digital conversion means for converting said analog multicarrier QAM signal into a digital time-domain multicarrier QAM signal using a predetermined sample frequency from a receiver clock generator;
b) time-domain/frequency-domain conversion means for converting said digital time-domain multicarrier QAM signal into a digital frequency-domain multicarrier QAM signal consisting of a plurality of complex QAM data values;
c) decoding means for respectively selecting a complex default QAM data value representing a known digital data symbol on the basis of said complex QAM data values and for decoding said complex default QAM data values into said digital output signal; and
d) timing recovery means for adjusting a phase of said receiver clock generator such that the sample timing in said analog/digital conversion means coincides with that used in a transmitter which generates said analog multicarrier signal;

wherein
e) said timing recovery means comprises:
   e1) phase rotation direction determining means for determining a plurality of phase rotation direction values of a respective complex QAM data value with respect to a corresponding complex default QAM data value; and
   e2) average phase rotation direction determining means for determining an average phase rotation direction value by averaging all respective rotation direction values; and wherein
f) said phase of said sample frequency is adjusted on the basis of said average phase rotation direction value.

This object is also solved by a multicarrier QAM communication system for transmitting information using a multicarrier QAM between a transmitter and a receiver, comprising at said transmitter:
a) coding means for coding an input bit stream into a digital frequency-domain multicarrier QAM signal consisting of a number of complex QAM data values using a multicarrier QAM technique;
b) frequency-domain/time-domain conversion means for converting said digital frequency-domain multicarrier QAM signal into a digit:al time-domain multicarrier QAM signal consisting of number of separate QAM samples; and
c) digital/analog conversion means for converting said samples of said digital time-domain multicarrier QAM signal into an analog multicarrier QAM signal using a predetermined transmitter sample frequency from a transmitter clock generator; and
at said receiver:
d) analog/digital conversion means for converting said analog multicarrier QAM signal into a digital time-domain multicarrier QAM signal using a predetermined sample frequency from a receiver clock generator;
e) time-domain/frequency-domain conversion means for converting said digital time-domain multicarrier QAM signal into a digital frequency-domain multicarrier QAM signal consisting of a plurality of complex QAM data values;
f) decoding means for respectively selecting a complex default QAM data value representing a known digital data symbol on the basis of said complex QAM data values and for decoding said complex default QAM data values into a digital output signal; and
g) timing recovery means for adjusting a phase of said receiver clock generator such that the sample timing in said analog/digital conversion means coincides with that used by said digital/analog conversion means in said transmitter;
wherein
h) said timing recovery means comprises:
   h1) phase rotation direction determining means for determining a plurality of phase rotation direction values of a respective complex QAM data value with respect to a corresponding complex default QAM data value; and
   h2) average phase rotation direction determining means for determining an average phase rotation direction value by averaging all respective rotation directions; and wherein
   i) said phase of said sample frequency is adjusted on the basis of said average phase rotation direction value.

The object is also solved by a method in a multicarrier QAM system for receiving and demodulating an analog multicarrier QAM signal into a digital output signal consisting of successive digital data symbols, comprising the following steps:
a) converting said analog multicarrier QAM signal into a digital time-domain multicarrier QAM signal using a predetermined sample frequency from a receiver clock generator;

b) converting said digital time-domain multicarrier QAM signal into a digital frequency-domain multicarrier QAM signal consisting of a plurality of complex QAM data values;

c) selecting respectively a complex default QAM data value representing a known digital data symbol on the basis of said complex QAM data values and decoding said complex default QAM data values into said digital output signal; and d) adjusting a phase of said receiver clock generator such that the sample timing used in said analog/digital conversion step coincides with that used in a transmitter which generates said multicarrier QAM signal; characterized by the following steps:

e1) determining respectively a plurality of phase rotation direction values of a respective complex QAM data value with respect to a corresponding complex default QAM data value; and e2) determining an average phase rotation direction value by averaging all respective rotation direction values; and f) adjusting said phase of said sample frequency or he basis of said average phase rotation direction value.

According to the invention, the timing recovery means comprises a phase rotation direction determining means and an average phase rotation direction determining means. Rather than using the single pilot tone, the timing recovery means estimates a phase rotation direction of each complex QAM data value with respect to a corresponding complex default QAM data value. As explained above, the rotation direction can be clockwise or counterclockwise in the complex plane. Only the general direction for each complex QAM data value need to be determined.

The average phase rotation direction determining means then averages the respective rotation directions of all data symbols in the output of the FFT means. The average rotation direction which is based on an estimation of all data symbols is then used to adjust the phase in the receiver clock, i.e. in the numerically-controlled oscillator in the phase-locked loop. Thus, the averaging gives an overall estimate for the wrong synchronization of the sample rate in the receiver, rather than just adjusting the phase on the basis of a rotation of a single pilot tone of a known phase.

Advantageously, the data directed method using an average of all phase rotation directions of all data symbols can be used together with the pilot tone method of the prior art. Then, the phase rotation due to the pilot tone evaluation and the average phase rotation of the data directed procedure can be added to result in an overall estimate for adjusting the phase. However, the equalizer (coefficient) for the pilot tone carrier must be fixed. This is in particular advantageous, since there might arise a situation—if the equalizer is used separately—that the equalizer rotates the complex QAM data values in one direction whilst the phase rotation direction determining means and the average phase rotation direction determining means exactly rotate the data symbols in the opposite direction.

According to a further advantageous embodiment of the invention, it is not explicitly necessary to determine the phase rotation angle itself to determine the overall rotation direction. It is only necessary to process the sign of the real and imaginary parts or the error vector between the received and transmitted data symbol in order to determine the quadrant in the complex plane in which the error vector lies and to determine the direction in which it points.

According to another embodiment of the invention, the individual phase rotation direction values of each carrier (complex QAM data value) can be weighted with a weighting factor before such weighted phase rotation direction values are averaged in the average phase rotation direction determining means. For example, a signal-to-noise ratio can be calculated for each carrier and the weighting factor can be made dependent on the signal-to-noise ratio (therefore, the noise on each carrier contributing to a possible rotation, can be included to result in an even better overall averaged phase rotation direction value).

Further advantageous embodiments and improvements of the invention are listed in the dependent claims. Hereinafter, the invention will be further illustrated by describing specific embodiments and by referring to the attached drawings in which the same or similar reference numerals designate the same or similar parts.

BRIEF DESCRIPTION OF THE DRAWINGS

FIG. 3 shows a diagram explaining the symbol rate and the bit rate;

FIG. 12-1 to FIG. 12-4 show a table of the error vectors $e_k$ output from the sign extractor 21-3 for the three cases A, B, C in FIG. 11 and the respective values in the circuit on FIG. 11;

FIG. 14 shows a table of values when a specific binary coding of the real and imaginary part of $Y_K$ and $e_{K''}$ and of $d_K$ is used, in particular the binary coding for cases A, B and C in FIG. 11.

Figure 2:
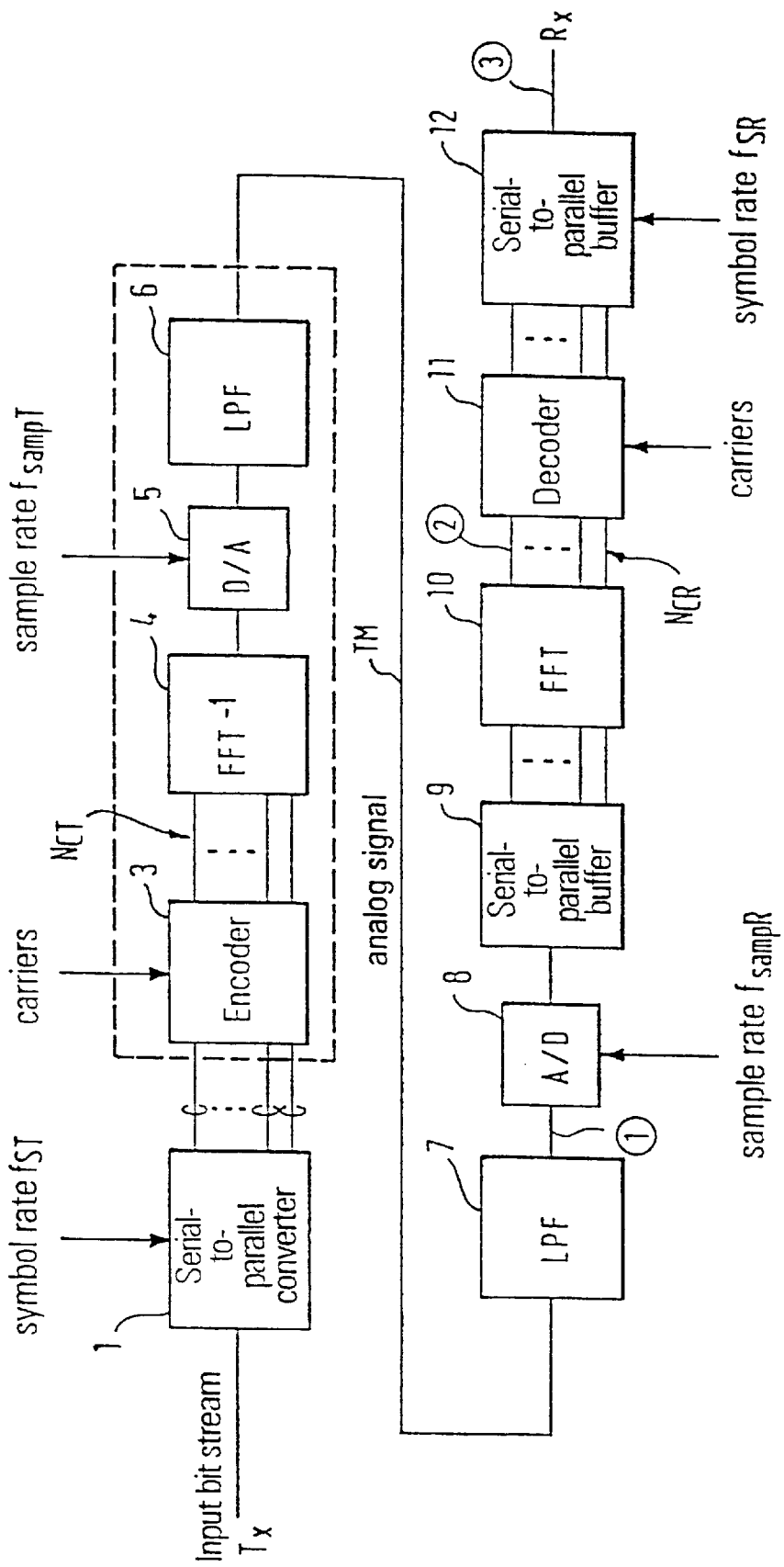
FIG. 2 shows a basic multicarrier QAM system where Fourier transform means are used for the modulation/demodulation.

Hereinafter, embodiments of the invention are described with reference to the attached drawings. The embodiments of the invention are used in a multicarrier QAM system as is generally shown in FIG. 2.

Basic Principle of the Data Directed Phase Adjustment

Figure 7:
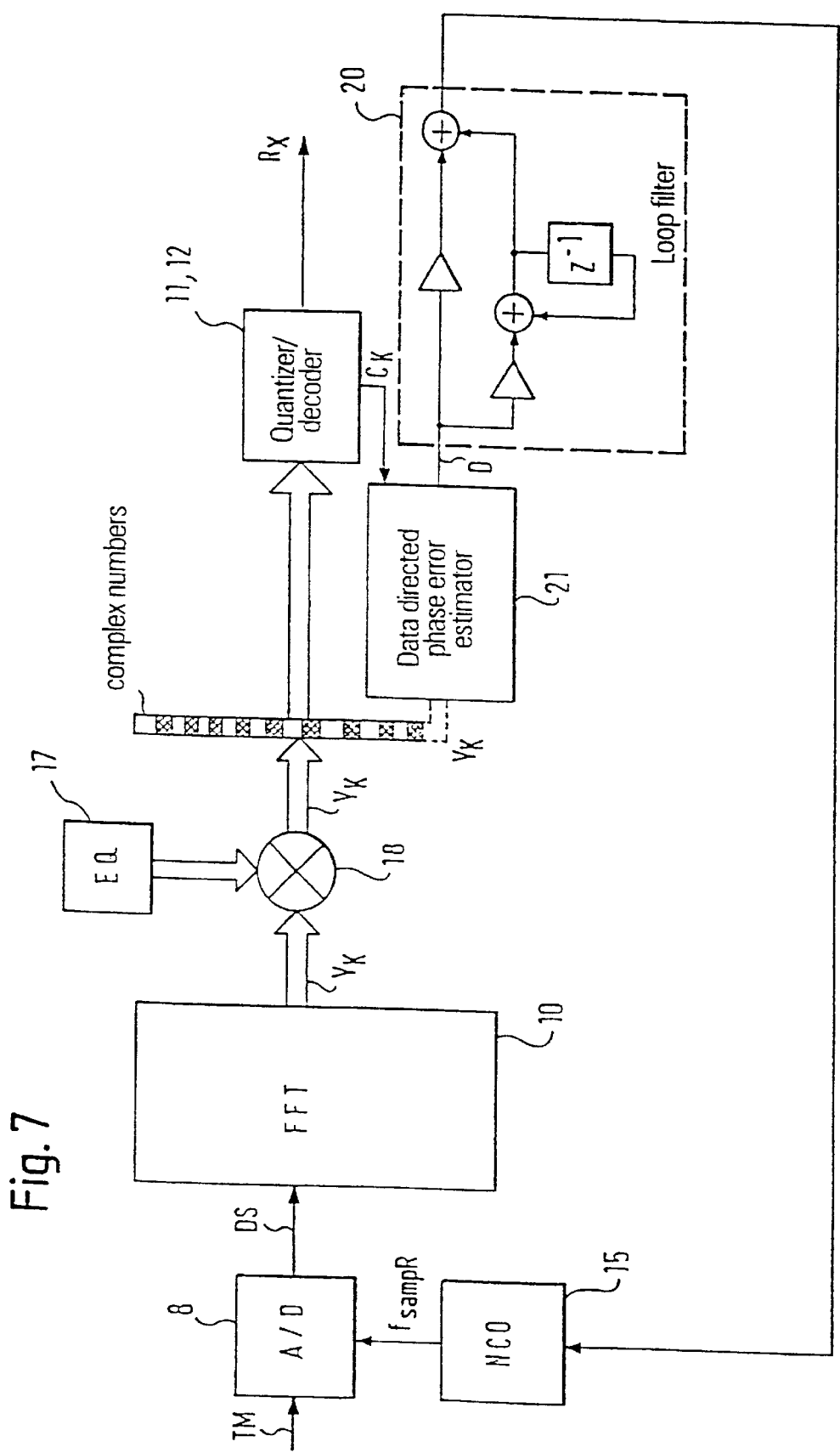
FIG. 7 shows a principle block diagram of a multicarrier QAM receiver using a data directed phase error estimator for obtaining an average phase rotation direction value D.

FIG. 7 shows an embodiment of a receiver in a multicarrier QAM system using a data directed phase error estimator 21 for readjusting the phase of the numerically-controlled oscillator 15 outputting the receiver sample rate $f_{sampR}$ to the analog/digital conversion means 8.

Figure 1:
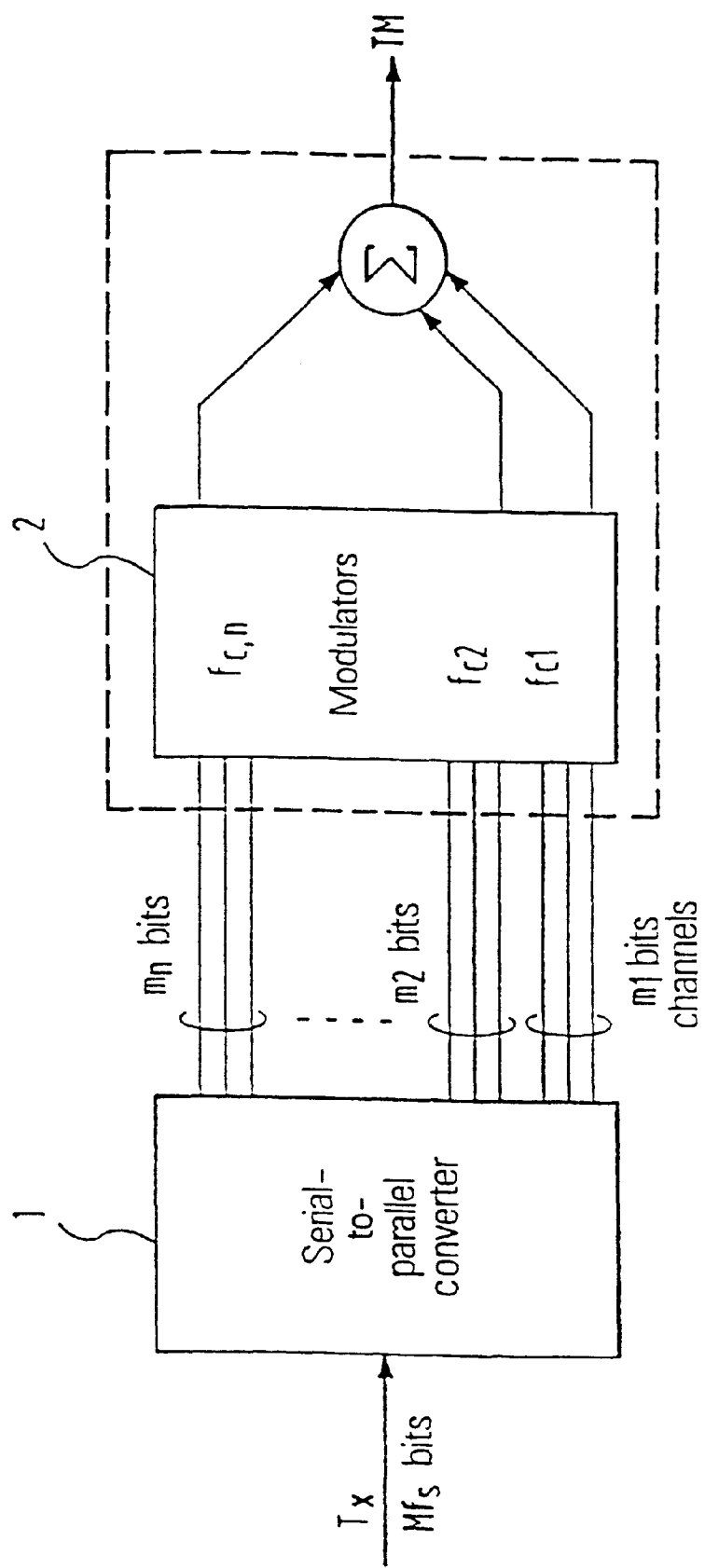
FIG. 1 shows the principle of a multicarrier transmitter for modulating a number of carriers $f_{c,n}$ with a particular number of $m_n$ bits.
Figure 4:
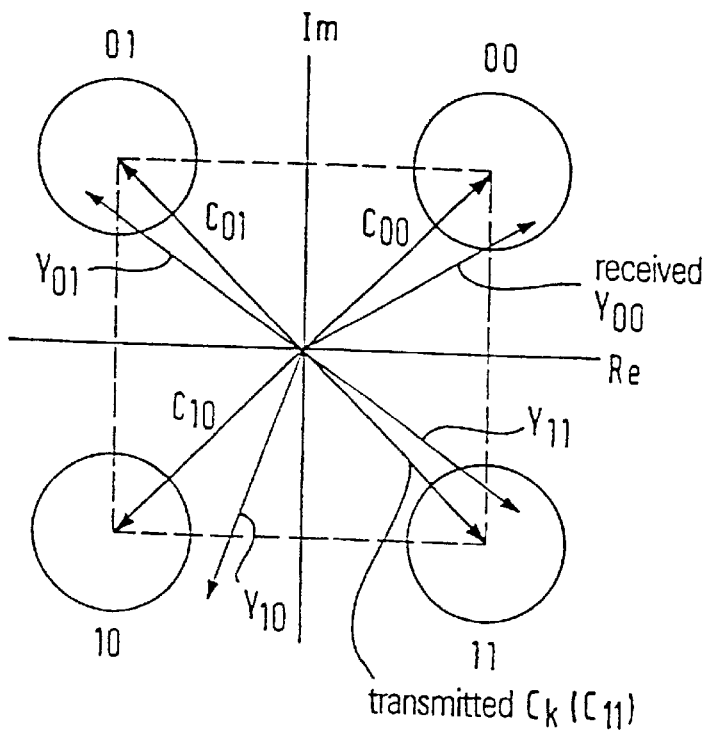
FIG. 4 shows an example of a multicarrier QAM demodulation using four data symbols for one carrier.

The analog/digital conversion means 7, 8 converts the analog multicarrier QAM signal received from the transmission line TM into a digital time-domain multicarrier QAM signal using the predetermined sample frequency from the receiver clock generator NCO. As in FIG. 2, the time-domain/frequency-domain conversion means converts the digital time-domain multicarrier QAM signal DS into a digital frequency-domain multicarrier QAM signal $Y_K$ consisting of a plurality of complex QAM data values $Y_{00}, Y_{01}, Y_{10}, Y_{11}$ as is e.g. illustrated in FIG. 4. Leaving aside the function of the equalizer EQ 17 (as explained with reference to FIG. 6), then the digital frequency-domain multicarrier QAM signal $Y_K$ is output to the decoding means 11, 12 which respectively selects a complex default QAM data value representing a known digital data symbol on the basis of the complex QAM data values $Y_K$ and which decodes the complex default QAM data values selected into the digital output signal $R_x$ consisting of a number of consecutive bits which should correspond to the consecutive bits of the input data stream $T_x$ (see FIG. 2). That is, for each carrier one complex QAM data value is determined by the FFT 10 and it is then decided to which bit symbol it corresponds by comparing it with known default values. Each carrier can be used for decoding the same number of bits or in fact a different number depending on the allocation as shown in FIG. 1.

That is, for the decoding the complex numbers $Y_K$ are used. As explained before, the timing recovery means 21, 20 adjusts the phase of the receiver clock generator NCO such that the sample timing in the analog/digital conversion means 8 coincides with that used in a transmitter which generates the analog multicarrier signal. According to the invention, this timing recovery means 21, 20 comprises a data direct phase error estimator which uses several (or all) complex numbers $Y_K$ output by the time-domain/frequency-domain conversion means. That is, by contrast to the pilot tone method explained before, several (or all) complex carriers having possible phase rotations with respect to the complex default QAM values are evaluated together in order to readjust the phase of the receiver clock generator NCO.

Essentially, the timing recovery means 21 determines an overall phase rotation direction by considering all possible phase rotations of all complex QAM data values $Y_K$ with respect to the respective complex default QAM data values $C_K$ which are used by the decoding means 11, 12 for decoding. The phase of the sample frequency is then adjusted on the basis of this overall or average phase rotation direction output by the data directed phase error estimator 21. The loop filter 20 already belongs to the phase-locked loop PLL of the numerically-controlled oscillator 15 and its low pass filter integrates successive average phase rotation direction values (each corresponding to one data symbol).

The timing recovery means comprising the data directed phase error estimator does not explicitly calculate the phase rotation but it only needs to determine the direction of the phase rotation in each quadrant with respect to the complex QAM default value decoded by the decoding means 11, 12.

Figure 8:
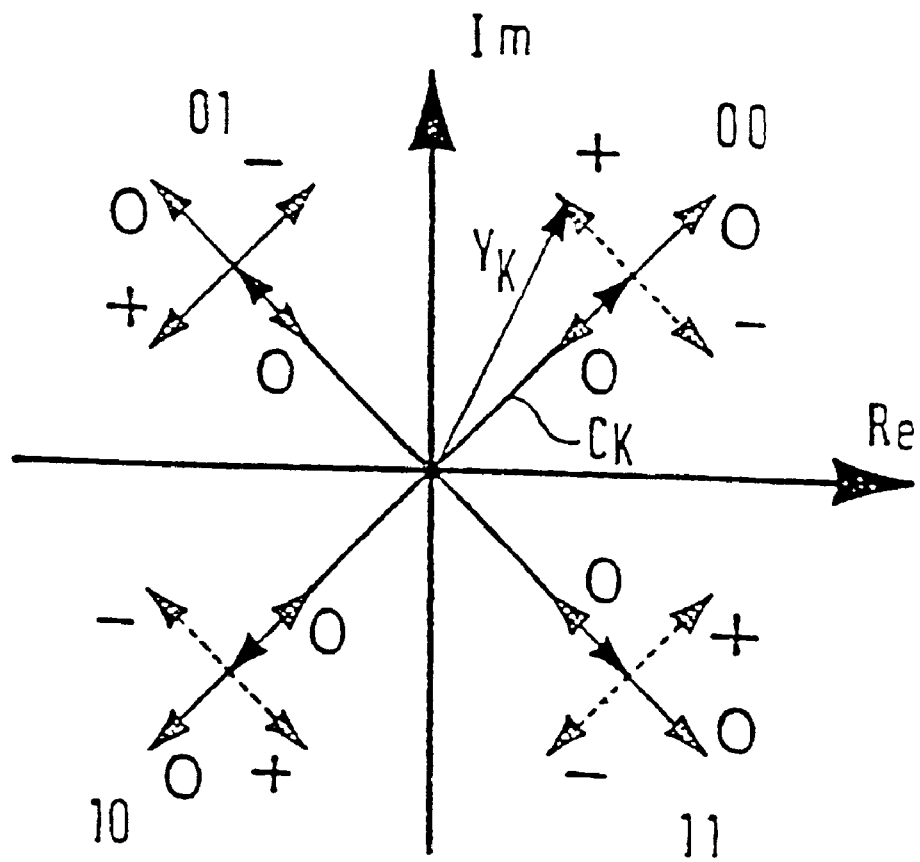
FIG. 8 shows a diagram specifying the positive phase errors, negative phase errors and 0 phase errors between the transmitted $C_K$ and received $Y_K$ complex QAM data values in the four quadrants in the complex plane.

FIG. 8 shows a diagram of the definitions of a positive phase error, a negative phase error and no phase error. As is seen in FIG. 8, a positive sign "+" is used to indicate that the received complex QAM data value $Y_K$ is rotated in a counterclockwise direction whilst a negative sign "−" is used for indicating a clockwise phase rotation direction. Obviously, if there is only a change in amplitude, then there is no phase error at all and this is indicated with 0 in FIG. 8. The timing recovery means determines the phase rotation direction of all received complex values $Y_K$ and determines from that an average phase rotation direction value by averaging all respective rotation directions for all carriers.

Figure 5:
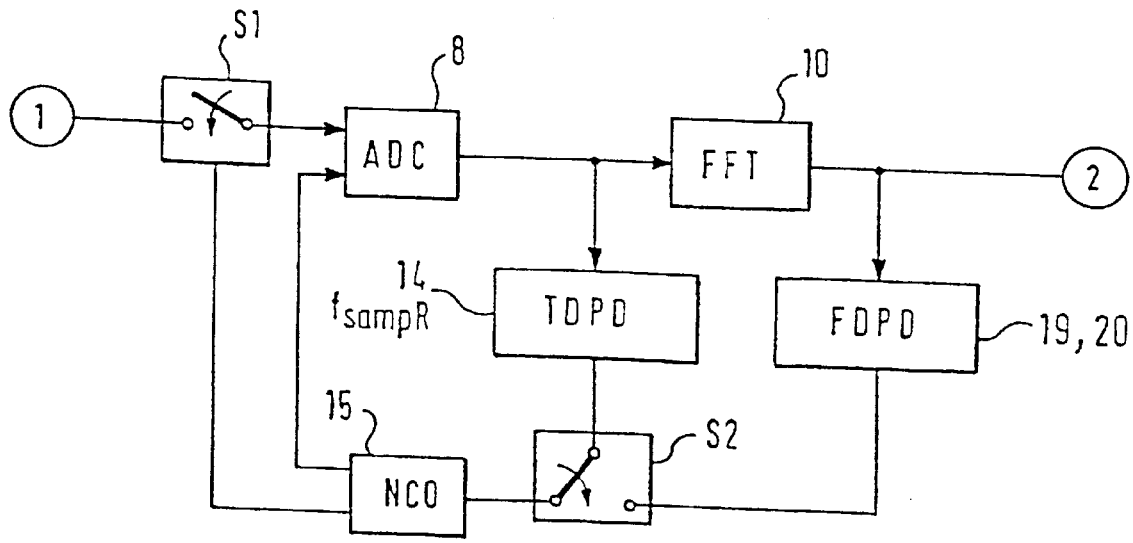
FIG. 5 shows the arrangement of a timing recovery circuit used in the multicarrier QAM system of FIG. 1.

Comparing FIG. 7 with FIG. 5, it becomes apparent that the data directed phase error estimation using the inventive timing recovery means essentially employs the frequency-domain phase detector 19, 20 when the switches S1, S2 are closed. That is, the phase adjustment is performed on the basis of a frequency-domain analysis.

First Embodiment

Figure 9:
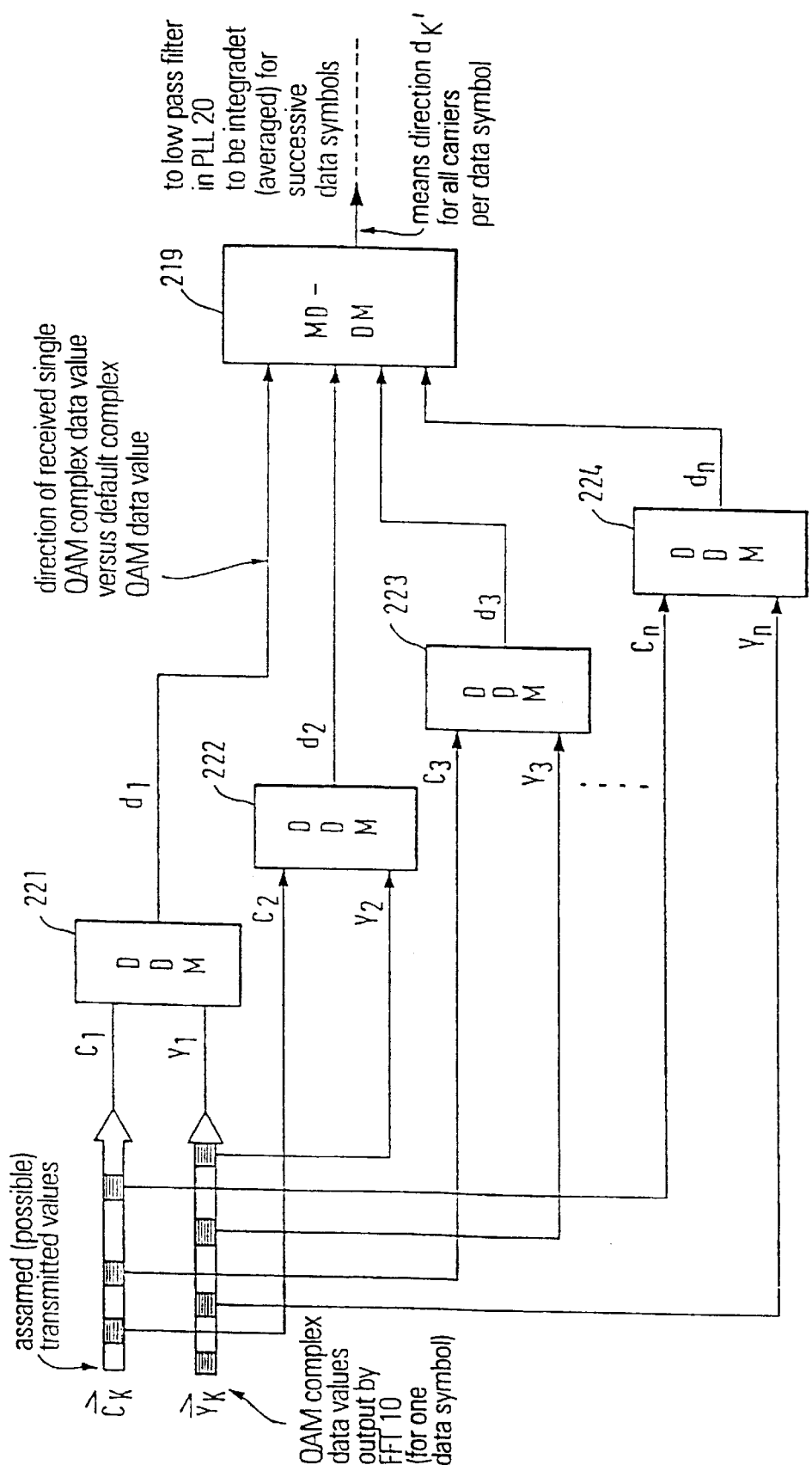
FIG. 9 shows an embodiment of the invention using a phase rotation direction determining means and an average phase rotation direction determining means.

FIG. 9 shows an embodiment of the timing recovery means using a phase rotation direction determining means 221–224 for each carrier. As was explained with respect to FIG. 1, there are a number n of carriers and each phase rotation direction determining means 221–224 respectively determines a phase rotation direction of each received complex QAM data value $Y_K$ with respect to a corresponding complex default QAM data value which is determined as the correct data value by the quantizer/decoder.

Thus, the phase rotation direction determining means 221–224 each output a phase rotation direction value $d_1, d_2 \ldots d_n$ indicating whether there is a positive phase error (+1), a negative phase error (−1) or no phase error (0).

The average phase rotation direction determining means 219 determines an average phase rotation direction value $d_{K'}$, by averaging all respective phase rotation direction values $d_1, d_2, d_3, \ldots d_n$ for all carriers. Although in principle, the plurality of phase rotation direction values $d_1 \ldots d_n$ can be an exact measure of the respective phase rotation angles, according to the preferred embodiment of the invention, the phase rotation direction values $d_1 \ldots d_n$ are only values of −1 (negative phase rotation), +1 (positive phase rotation) and 0 (no phase rotation). The average phase rotation direction value per channel $d_{K'}$ is determined as follows:

$$d_{K'} = \left(\sum_{n=1}^{N} d_n\right) / N_C \qquad (2)$$

$N_c$ desiccates the number of carriers such that the average phase rotation direction value is in a range between 0% (only negative phase rotations) and 100% (only positive phase rotations) When $d_{K'}$ is 50% (this will probably be caused by noise), then half of the carriers will have a positive phase rotation and half of the carriers will have a negative phase rotation such that no phase adjustment is performed.

The average phase rotation direction value $d_{K'}$ representing the phase rotation direction averaged over several (or all) complex QAM values (points of the FFT) of one respective data symbol (see the definitions in FIG. 3) is then input to the PLL loop 20 where a low pass filter thereof performs a successive integration of successively arriving values $d_{K'}$. Thus, since each value $d_{K'}$ represents a measure for one data symbol, the low pass filter performs an averaging of the phase rotation direction over successive data symbols. Thus, the phase of the sample Frequency $f_{sampR}$ is over time adjusted on the basis of the average phase rotation direction values $d_{K'}$.

Specifically, it should be noted that the value $d_{K'}$ indicates a measure for the overall direction and not a direct measure of the amount of the phase rotation. It is only necessary to steer the phase-locked loop PLL containing the numerically-controlled oscillator NCO in the correct direction each time the value $d_{K'}$ is calculated such that after several evaluations the oscillator will move more and more in the correct direction until the phase of the sample frequency coincides with that used in the transmitter.

Thus, the inventive timing recovery means uses the phase component of the error vectors between $Y_K$, $C_K$. In order to get a good estimate of the phase error, the average phase direction value $d_{K'}$ is calculated respective for several (or all) carriers of the data symbol. To simplify the operations, only the sign of the phase error is used. The sign of the phase error can be calculated from the sign of the real and imaginary part of the received or decoded symbols combined with the sign of the real and imaginary part of the errors. This method results in a lower noise in the phase estimate then using the pilot tone only because it is an average from several (or all) carriers. This calculation using only the sign of the phase error is explained with respect to the embodiment of the invention shown in FIG. 10 to be explained below.

Second Embodiment of the Invention

Figure 10:
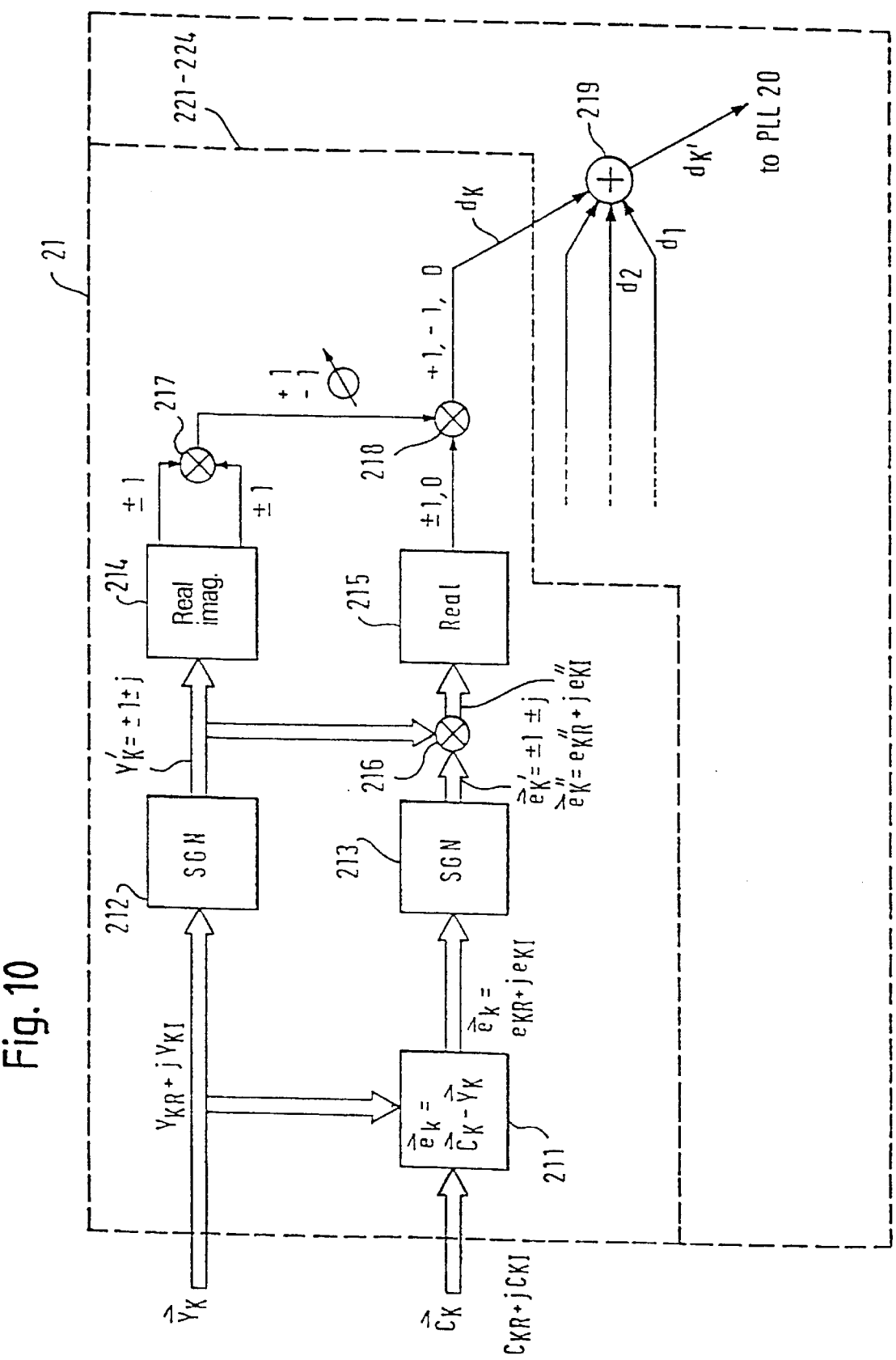
FIG. 10 shows an embodiment of the phase rotation direction determining means 221–224 together with the averaging means 219 used in FIG. 9.

The embodiment of the phase rotation direction determining means 221–224 and the average phase rotation direction determining means 219, 220 is shown in. FIG. 10. A subtractor 211 calculates a complex error value $e_k = e_{KR} + j\, e_{KI}$ by subtracting the complex QAM data value $Y_k$ from the corresponding complex default QAM data value $C_k$.

A first complex sign extractor 212 forms a first complex sign value $Y_{K'}$ from the input complex QAM data value $Y_k = Y_{KR} + j\, Y_{KI}$. When the real part $Y_{KR}$ is positive, then the real part of $Y_{K'}$ is +1. When the real part $Y_{KR}$ is negative, then the real part of $Y_{KI}$ is −1. Likewise, when the imaginary part $Y_{KI}$ is positive, then the imaginary part of $Y_{K'}$ equals +1. When the imaginary part $Y_{KI}$ is negative, then the imaginary part of $Y_{K'}$ is −1.

The function of the second complex sign extractor 213 is equivalent to the function of the first complex sign extractor 212 only that it operates on the phase error vector $e_k = e_{KR} + j\, e_{KI}$. That is, the first complex sign value $Y_{K'}$ and the second complex sign value $e_{K'}$ both only contain ±1 and ±j.

A first multiplier 216 forms a third sign value $e_k''$ by simply multiplying the first complex sign value $Y_{K'}$ with said second complex sign value $e_{K'}$. The means 214 extracts the real and imaginary part of the first complex sign value $Y_{K'}$ and the second multiplier 217 multiplies the real part with the imaginary part to obtain a quadrant determining value which can be +1, −1 or 0. The quadrant determining value indicates the quadrant in the complex plane where the complex QAM data value is located.

The means 215 looks at the real part of the second complex sign value $e_K''$ and sets a value of +1, when the real part is positive, sets a value of −1, when the real part is negative and sets a value of 0, when the real part is zero. A third multiplier 218 forms the phase rotation direction value $d_k$ by multiplying the output from the means 215 with the output from the second multiplier 217. Since the output of the multiplier 217 as well as the output of the means 215 can only assume integer values of +1, −1, 0, also the phase rotation direction value $d_k$ can assume integer values of +1, −1, 0. $d_K$ will therefore simply indicate whether the phase rotation is counterclockwise (+1), clockwise (−1) or whether there is no phase rotation (0) at all.

As explained before, the average phase rotation direction determining means 219 comprises an adder 219 which outputs as said average phase rotation direction value $d_{k'}$ a sum of all phase rotation directions $d_1, d_2, \ldots, d_K$ divided by the number of complex QAM data values $N_c$. As explained, since $d_{k'}$ corresponds to the average phase rotation per data symbol, a low pass filter of the PLL can then average the direction by a successive integration over several data symbols ($d_{k'}$ values)

Example of Phase Rotation Direction Adjustment

Figure 11:
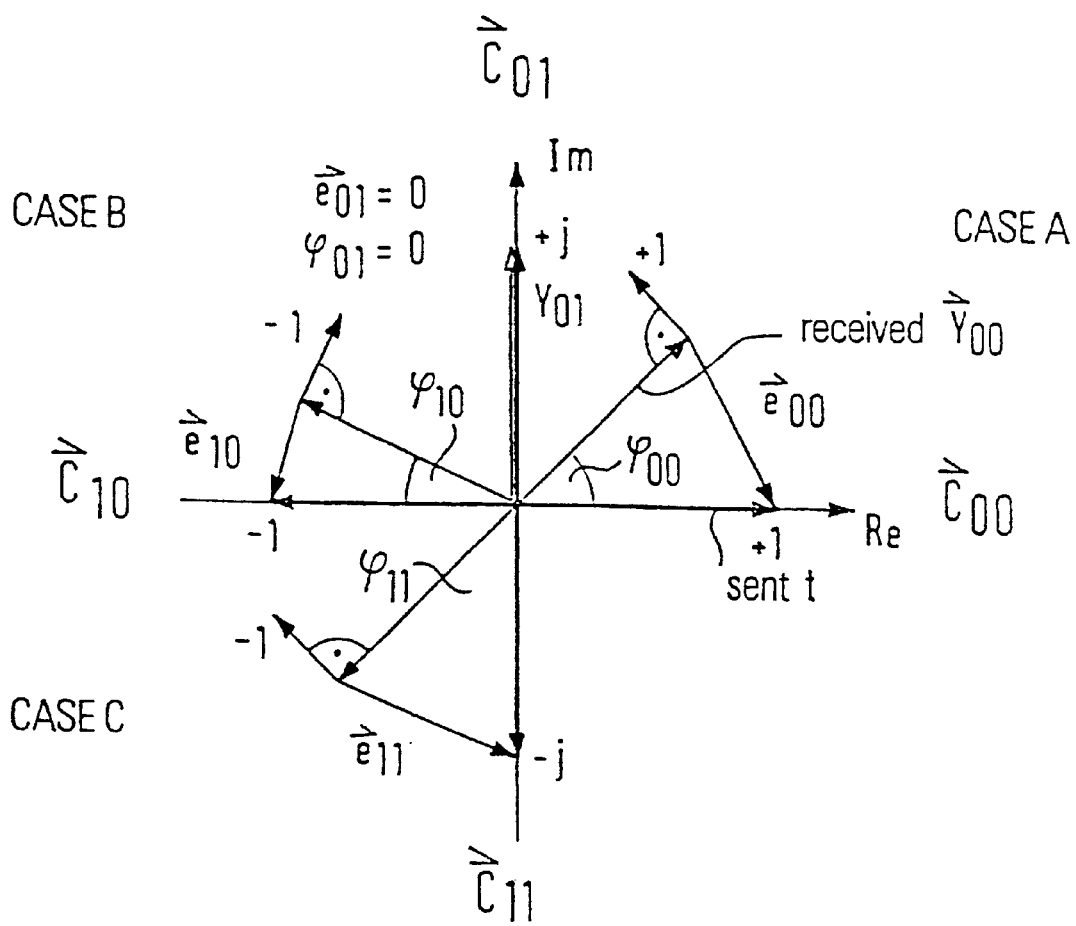
FIG. 11 shows an example of the determination of the phase rotation direction for a multicarrier QAM system using four carriers with each four possible signal points.
Figures 2, 12:
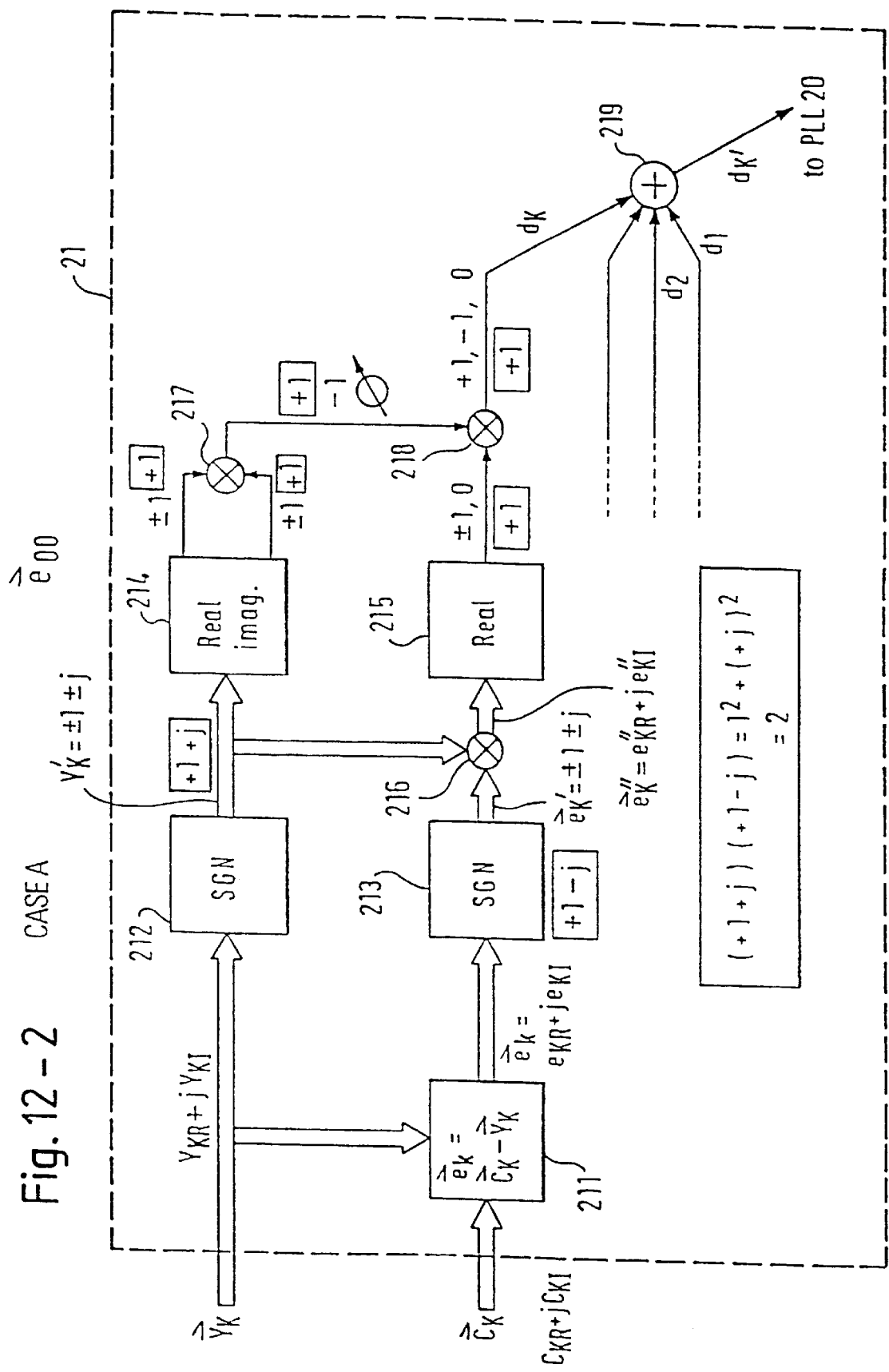
Figures 3, 12:
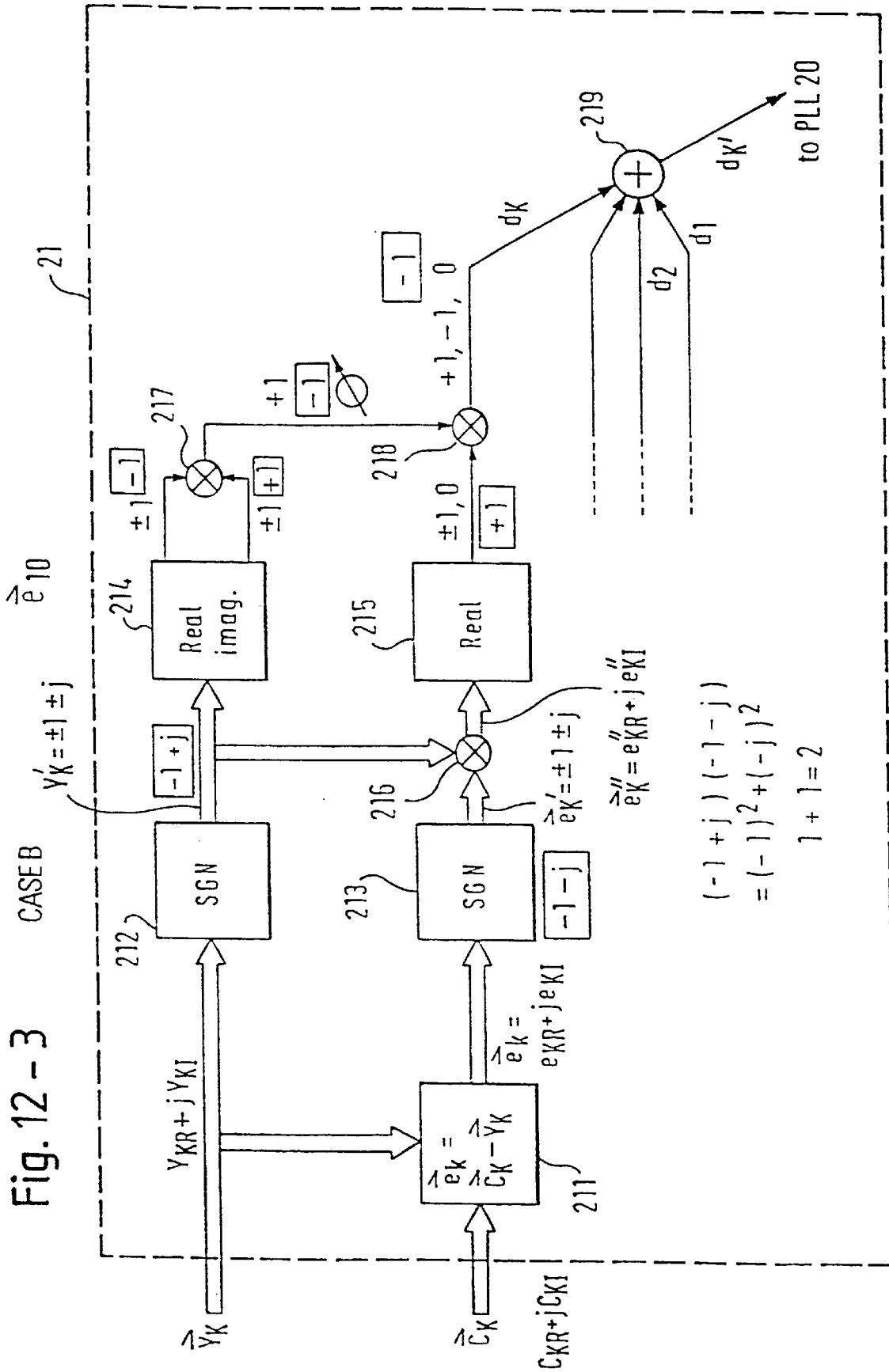

FIGS. 11, 12 show an example of the phase rotation direction determining means of a multicarrier QAM system using four possible signal points on each one of the carriers per complex QAM data value. As is shown in FIG. 11, the sent complex default QAM data values in the transmitter are $C_{00}=+1$, $C_{01}=+j$, $C_{10}=-1$ and $C_{11}=-j$. Ideally, the values $Y_K$ in the receiver should be identical to those $C_K$ sent from the transmitter. However, in FIG. 11, only the symbol 01 coincides with the one sent from the transmitter since there is no phase rotation ($\phi_{01}=0$, $C_{01}=Y_{01}$; $e_{01}=0$).

In case A, there is a counterclockwise phase rotation direction +1 regarding the angle $\phi_{00}$ such that the error vector $e_{00}$ output by the subtractor 211 is formed. Likewise, there is a negative phase rotation direction −1 in case B, i.e. a clockwise phase rotation. Furthermore, in case C, there is again a clockwise phase rotation regarding the angle $\phi_{11}$. As indicated in FIG. 11, the error vector $e_K$ is formed by subtracting $Y_K$ from $C_K$.

FIG. 12-1 is a table that shows the respective values of the error value $e_K$ with respect to $C_K$, $Y_K$. In FIG. 12, it is assumed that in case A, there is exactly a $-\pi/2$ phase rotation in the counterclockwise direction while in case B, an arbitrary angle $\phi_{10}$ is assumed (here resulting in the received value $Y_K$ to be $-0.1+j\,0.1$). Case C relates to a phase angle $\phi_{11}=+\pi/2$.

In FIGS. 12-2, 12-3, 12-4, the respective values of cases A, B, C are illustrated. The framed numbers respectively designate the values calculated by the means 211–218. As can be taken from these figures, the output value $d_k$ correctly indicates that a counterclockwise positive phase rotation direction (+1) exists in case A and a negative phase rotation (−1) occurs in case B, case C.

Third Embodiment

In FIGS. 7 to 12, the phase rotation direction values $d_1 \ldots d_n$ are integers of +1, −1, 0 to indicate the counterclockwise and clockwise phase rotation which is then averaged by the adder 219.

However, according to another embodiment of the invention, it is possible to apply a weighting to each phase rotation direction value $d_{K'}$. That is, before the adder 219 averages all single phase rotation direction values, a weighting is applied to each carrier. For example, a special unit can calculate a signal-to-noise ratio for each carrier and determine a weighting factor for each carrier dependent on the signal-to-noise ratio. In this case, the phase rotation direction values are not pure integers of +1, −1, 0 but real values depending on the weighting factor determined from the signal-to-noise ratio. That is, some carriers can be very noisy so that they should have less influence on the estimate. On the other hand, higher carrier frequencies are more sensitive to a change of sampling timing and therefore the weighting for high carrier frequencies can be increased.

Fourth Embodiment

Figure 6:
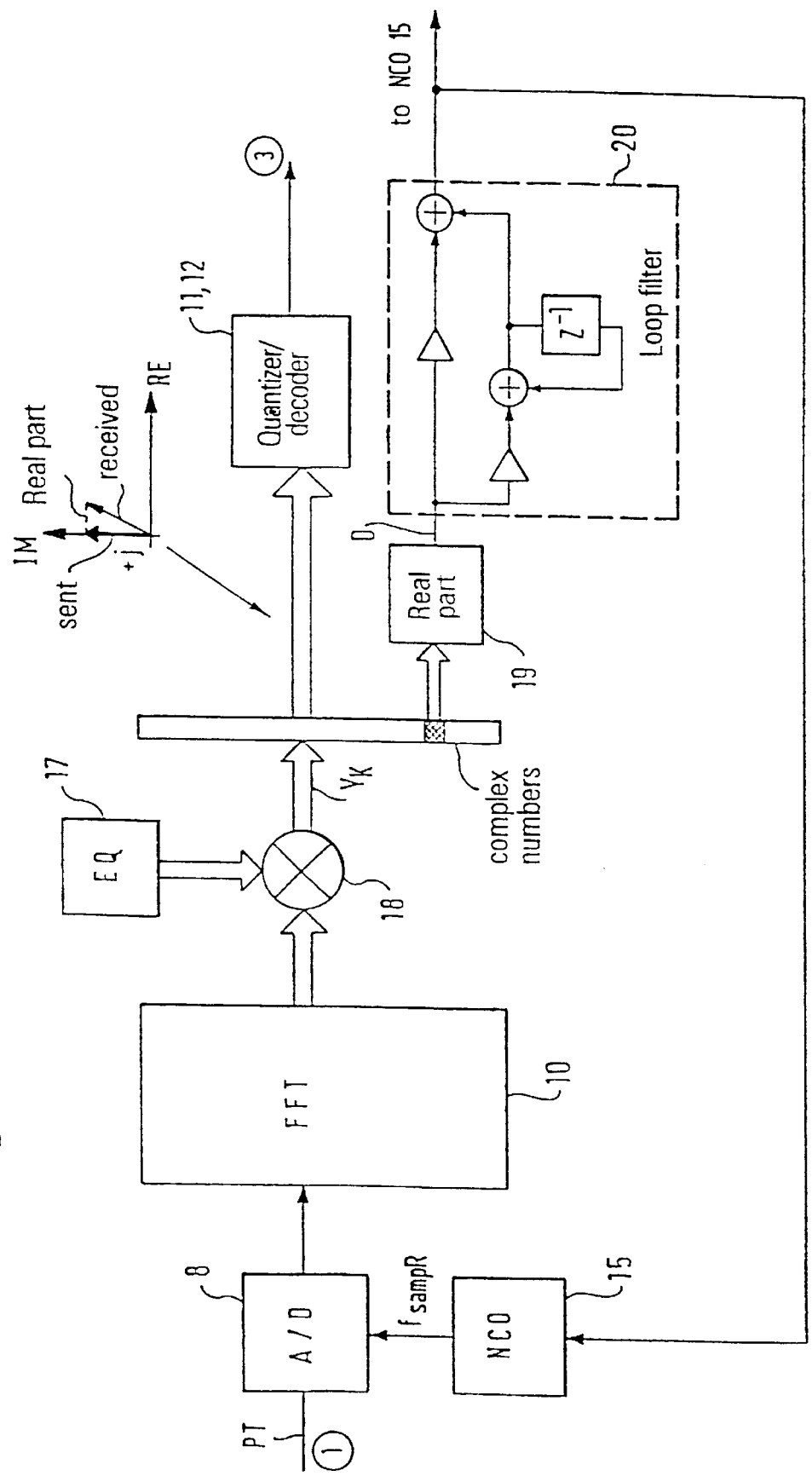
FIG. 6 shows a multicarrier QAM receiver using a time-domain phase adjustment employing a single pilot tone PT sent from the transmitter.
Figure 13:
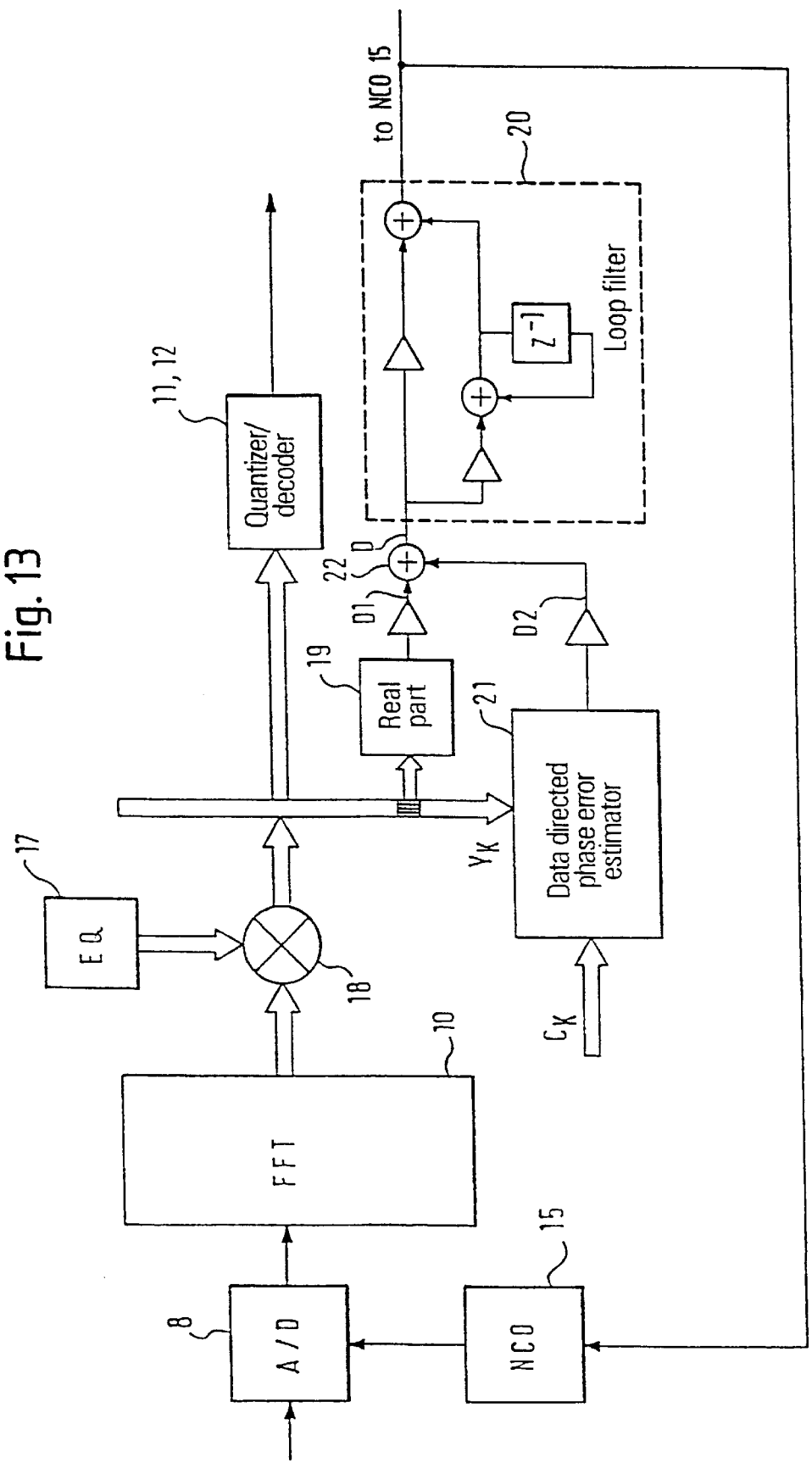
FIG. 13 shows an embodiment of the invention in which the phase adjustment of the sample rate using the pilot tone as in FIG. 6 and the phase adjustment of the sample rate using the data directed adjustment of FIG. 7 are combined.

In FIG. 6, it was already explained that a single pilot tone can be used by the equalizer 17 to perform modifications on the coefficients of the complex values output on the time-domain/frequency-domain conversion means 10. However, as is shown in FIG. 13, the tone phase adjustment can be used together with the data directed phase error estimation. Here, the data directed phase error estimator 21 uses all complex QAM values $Y_K$ as was explained with respect to FIG. 7. The phase of the sample frequency $f_{sampR}$ is then adjusted on the basis of a combination of the average phase rotation direction value $D_2$ output by the timing recovery means 21 and said pilot tone phase direction $D_1$ output from the means 19. The combination can be the weighted sum of the average phase rotation direction value $D_2$ and the pilot tone phase direction value $D_1$.

It is thus possible to use the pilot tone and to freeze the equalizer 17 for that tone in order to prevent the equalizer 17 and the timing recovery means 21 to adapt in different directions. The phase error estimate can be formed from a weighted sum of the phase error from the pilot tone and the phase error from the data.

Therefore, the equalizer 17 can—on the basis of the extracted real part from the received pilot tone, as was explained with reference to FIG. 6—perform a modification on the output from the means 10 and the equalizer adjustment is then frozen. Subsequently, the data directed phase error estimator performs an adaptation of the phase of the numerically-controlled oscillator 15. The freezing of the equalizer 17 after the real part extraction and adjustment is necessary in order to avoid that the rotations performed by the equalizer 17 and the means 21 compensate each other.

Fifth Embodiment

The individual signals shown in FIG. 10 can also be binary coded as is shown in FIG. 14 In FIG. 14, the signals are decoded in the following manner:

| | |
|---|---|
| Real part: | binary 0 = +1.0 |
| | binary 1 = −1.0 |
| Imaginary part: | binary 0 = +j |
| | binary 1 = −j |

The direction values $d_K$ can be coded using a two-bit binary value code as follows:
Binary 00=0.0
Binary 01=+1.0
Binary 10=not used
Binary 11=−1.0

In FIG. 14, also cases A, B, C explained above are indicated.

The binary value for the averaged direction $d_{k'}$ per data symbol is then used for controlling the numerically-controlled oscillator in a positive or a negative direction. After doing this successively over many values $d_{k'}$ over time (many data symbols over time), the numerically-controlled oscillator will adjust the phase in the correct direction until it is locked to the correct phase.

Industrial Applicability

As explained above, the receiver of a multicarrier QAM system, the multicarrier QAM system as well as the method for phase adjustment employ an overall estimate of the phase rotation direction obtained from all positions of the carriers in the complex plane. Thus, the method comprises an estimate obtained from all carriers rather than just looking at one separate pilot tone as in the prior art. Therefore, the phase adjustment of the sample rate is superior and more accurately decoded data symbols for the multicarrier QAM system can be obtained.

The invention finds wide applicability in different ranges of general switched telephone networks, cellular radios and modem technologies requiring highly accurate decoded data symbols.

The invention is not limited to the embodiments described above. Therefore, other modifications and variations can be performed within the protection scope of the attached claims. In the claims, reference numerals only serve illustration purposes and do not limit the protection scope of the claims.

What is claimed is:

1. A receiver of a multicarrier QAM system for receiving and demodulating an analog multicarrier QAM signal TM into a digital output signal ($R_x$) consisting of successive bits, comprising:
   a) analog/digital conversion means (7, 8) for converting said analog multicarrier QAM signal TM into a digital time-domain multicarrier QAM signal (DS) using a predetermined sample frequency ($f_{sampR}$) from a receiver clock generator (NCO, 15);
   b) time-domain/frequency-domain conversion means (10) for converting said digital time-domain multicarrier QAM signal (DS) into a digital frequency-domain multicarrier QAM signal consisting of a plurality of complex QAM data values ($Y_1, Y_2 \ldots Y_k$; $Y_{00}, Y_{01}, Y_{10}, Y_{11}$);
   c) decoding means (11, 12) for respectively selecting a complex default QAM data value ($C_k, C_{00}, C_{01}, C_{10}, C_{11}$) representing a known digital data symbol (00, 01, 10, 11) on the basis of said complex default QAM data values and for decoding said complex default QAM data values into said digital output signal; and
   d) timing recovery means (14, 16, 19–21) for adjusting a phase of said receiver clock generator (NCO, 15) such that the sample timing in said analog/digital conversion means (7, 8) coincides with that ($f_{sampT}$) used in a transmitter (1–6) which generates said analog multi-carrier signal; characterized in that
   e) said timing recovery means (14, 16, 19–21) comprises:
      e1) phase rotation direction determining means (221–224) for determining a plurality of phase rotation direction values (−1, +1, 0; $d_1, d_2, d_3, d_k$) of a respective complex QAM data value ($Y_k$) with respect to a corresponding complex default QAM data value; and
      e2) average phase rotation direction determining means (219) for determining an average phase rotation direction value ($d_{k'}$) by averaging all respective rotation direction values; and wherein
   f) said phase of said sample frequency ($f_{sampR}$) is adjusted on the basis of said average phase rotation direction value ($d_{k'}$).

2. A receiver according to claim 1, characterized in that the plurality of phase rotation direction values ($d_k$) correspond to the number of carriers used in the QAM system, such that said average phase rotation direction value ($d_{k'}$) corresponds to a data symbol phase rotation direction value of a complex QAM data values for all bits of one data symbol, wherein said conversion means (10) successively outputs over time a plurality of complex QAM data values for all bits of one data symbol and wherein average data symbol phase rotation direction determining means (20) are provided for successively averaging the average data symbol phase rotation values after each outputting of second complex QAM data values by said conversion means.

3. A receiver according to claim 1, characterized in that said analog multicarrier QAM signal (TM) contains a pilot tone (PT) corresponding to a known digital data symbol (e.g. 01), wherein said timing recovery means (14, 16, 19–21) further comprises a pilot tone phase determining means (19) for determining a pilot tone phase rotation direction value of a complex QAM data value ($y_{k(PD)}$) corresponding to said received pilot tone with respect to a corresponding complex default QAM data value corresponding to said known digital data symbol of said pilot tone, wherein said phase of said sample frequency ($f_{sampR}$) is adjusted on the basis of a combination (22) of said average phase rotation direction value (D2) and said pilot tone phase direction (D1).

4. A receiver according to claim 3, characterized in that said combination (22) is a weighted sum of said average phase rotation direction value (D2) and said pilot tone phase direction (D1).

5. A receiver according to claim 1, characterized in that:
said receiver clock generator (15, NCO) is a numerically controlled oscillator (NCO) incorporated in a phase locked loop (PLL) and said phase rotation directions ($d_k$) are coded as 2 bit values.

6. A receiver according to claim 1, characterized in that said phase rotation direction determining means (221–224) comprises:
e11) a subtractor (211) for calculating a complex error value ($e_k$) by subtracting said complex QAM data value ($y_k$) from said corresponding complex default QAM data value ($C_k$);
e12) a first complex sign extractor (212) for forming a first complex sign value ($Y_{k'}$)
whose real and imaginary part is −1 when the real part and the imaginary part of said complex QAM data value ($Y_k$) is respectively negative,
whose real and imaginary part is 0 when the real part and the imaginary part of said complex QAM data value ($y_k$) is respectively negative, and
whose real and imaginary part is +1 when the real part and the imaginary part of said complex QAM data value ($y_k$) is respectively positive;
e13) a second complex sign extractor (213) for forming a second complex sign value ($e_{k'}$)
whose real and imaginary part is −1 when the real part and the imaginary part of said complex error value ($e_k$) is respectively negative,
whose real and imaginary part is 0 when the real part and the imaginary part of said complex error value ($e_k$) is respectively negative, and
whose real and imaginary part is +1 when the real part and the imaginary part of said complex error value ($e_k$) is respectively positive;
e14) a first multiplier (216) for forming a third sign value ($e_{k''}$) by multiplying said first complex sign value ($y_{k'}$) with said second complex sign value ($e_{k'}$);
e15) a second multiplier (214, 217) for forming a quadrant determining value (0, ±1) by multiplying the real part (±1) of said first complex sign value ($y_{k'}$) with the imaginary part (±1) of said first complex sign value ($y_{k'}$), said quadrant determining value indicating the quadrant in the complex plane where said complex QAM data value is located;
e16) a third multiplier (215, 218) for forming said phase rotation direction value by multiplying the real part (215) of said third complex sign value ($e_{k''}$) with said quadrant determining value.

7. A receiver according to claim 1, characterized in that said average phase rotation direction determining means (219) comprises an adder (219) which outputs as said average phase rotation direction value ($d_k$) a sum of all phase rotation direction values divided by the number of complex QAM data values.

8. A receiver according to claim 2, characterized in that said average data symbol phase rotation direction determining means (20) is a low pass filter of a phase-locked loop (20) used for adjusting a phase of said receiver clock generator (NCO, 15).

9. A receiver according to claim 1, characterized in that said phase rotation direction value has a value +1, when said phase rotation of said complex QAM data value is in a counterclockwise direction from said decoded complex default QAM data value, said phase rotation direction value has a value 0, when no phase rotation of said complex QAM data value with respect to said decoded complex default QAM data value exists and said phase rotation direction value has a value −1, when said phase rotation of said complex QAM data value is in a clockwise direction with respect to said decoded complex default QAM data value.

10. A receiver according to claim 3, characterized in that said complex default QAM data value corresponding to said sent pilot tone has only an imaginary part (+j, −j), wherein said pilot tone phase rotation direction determining means (19) determines said pilot tone phase rotation direction value by determining the real part of said pilot tone complex QAM data value.

11. A receiver according to claim 1, characterized in that said timing recovery means further comprises a time domain sample frequency detector (TDPD, S1, S2) for recovering in the time domain said sample frequency ($f_{sampR}$) from an analog multicarrier QAM signal including a pilot tone, wherein said analog/digital conversion means (8) samples said received multicarrier QAM signal once per period of said pilot tone and the PLL of said receiver clock generator (15, NCO) is controlled based on the samples obtained.

12. A receiver according to claim 1, characterized in that said time-domain/frequency domain conversion means (10) comprises a Fourier transform means (FFT) for performing a Fourier Transform on said time-domain multicarrier QAM signal (DS).

13. A receiver according to claim 1, characterized by said timing recovery means further comprises a time domain symbol rate detector (TDPD, S1, S2) for recovering in the time domain a symbol rate and a symbol start position of individual symbols from said multicarrier QAM signal.

14. A receiver according to claim 1, characterized in that a weighting means is provided for weighting each of said phase rotation direction values with a weighting factor.

15. A receiver according to claim 14, characterized in that said weighting means calculates a SNR ratio for each carrier and said weighting factor depends on said calculated SNR ratio.

16. A multicarrier QAM communication system for transmitting information using a multicarrier QAM between a transmitter and a receiver, comprising at said transmitter:
a) coding means (1, 3) for coding an input bit stream ($T_x$) into a digital frequency-domain multicarrier QAM signal consisting of a number ($N_{cT}$) of complex QAM data values using a multicarrier QAM technique;

b) frequency-domain/time-domain conversion means (4) for converting said digital frequency-domain multicarrier QAM signal into a digital time-domain multicarrier QAM signal consisting of number of separate QAM samples; and c) digital/analog conversion means (5, 6) for converting said samples of said digital time-domain multicarrier QAM signal into an analog multicarrier QAM signal (TM) using a predetermined transmitter sample frequency ($f_{sampT}$) from a transmitter clock generator; and at said receiver:

d) analog/digital conversion means (7, 8) for converting said analog multicarrier QAM signal (TM) into a digital time-domain multicarrier QAM signal (DS) using a predetermined sample frequency ($f_{sampR}$) from a receiver clock generator (NCO, 15);

e) time-domain/frequency-domain conversion means (10) for converting said digital time-domain multicarrier QAM signal (DS) into a digital frequency-domain multicarrier QAM signal consisting of a plurality of complex QAM data values (($Y_1, Y_2 \ldots Y_k; Y_{00}, Y_{01}, Y_{10}, Y_{11}$);

f) decoding means (11, 12) for respectively selecting a complex default QAM data value ($C_k, C_{00}, C_{01}, C_{10}, C_{11}$) representing a known digital data symbol (00, 01, 10, 11) on the basis of said complex default QAM data values and for decoding said complex default QAM data values into a digital output signal; and g) timing recovery means (14, 16, 19–21) for adjusting a phase of said receiver clock generator (NCO, 15) such that the sample timing in said analog/digital conversion means (7, 8) coincides with that ($f_{sampT}$) used by said digital/analog conversion means (5) in said transmitter (1–6); characterized in that h) said timing recovery means (14, 16, 19–21) comprises:

h1) phase rotation direction determining means (221–224) for determining a plurality of phase rotation direction values (−1, +1, 0; $d_1, d_2, d_3, d_k$) of a respective complex QAM data value ($Y_k$) with respect to a corresponding complex default QAM data value; and h2) average phase rotation direction determining means (219) for determining an average phase rotation direction value ($d_k$) by averaging all respective rotation directions; and wherein i) said phase of said sample frequency ($f_{sampR}$) is adjusted on the basis of said average phase rotation direction value ($d_k$).

17. A system according to claim 16, characterized in that the plurality of phase rotation direction values ($d_k$) correspond to the number of carriers used in the QAM system, such that said average phase rotation direction value ($d_k$) corresponds to a data symbol phase rotation direction value of all complex QAM data values for all bits of one data symbol, wherein said conversion means (10) successively outputs over time a plurality of complex QAM values for all bits of one data symbol and wherein average data symbol phase rotation direction determining means (20) are provided for successively averaging the average phase rotation values after each outputting of said complex QAM data values by said conversion means.

18. A system according to claim 16, characterized in that said transmitter sends a pilot tone corresponding to an input bit stream of successive occurrences of a known digital data symbol (e.g. 01), wherein said timing recovery means (14, 16, 19–21) further comprises a pilot tone phase determining means (19) for determining a pilot tone phase rotation direction value of a complex QAM data value ($Y_{k(PD)}$) corresponding to said received pilot tone with respect to a corresponding complex default QAM data value corresponding to said known digital data symbol of said pilot tone, wherein said phase of said sample frequency ($f_{sampR}$) is adjusted on the basis of a combination (22) of said average phase rotation direction value (D2) and said pilot tone phase direction value (D1).

19. A system according to claim 18, characterized in that said combination (22) is a weighted sum of said average phase rotation direction value (D2) and said pilot tone phase direction value (D1).

20. A system according to claim 16, characterized in that said phase rotation direction determining means (221–224) comprises:

e11) a subtractor (211) for calculating a complex error value ($e_k$) by subtracting said complex QAM data value ($Y_k$) from said corresponding complex default QAM data value ($C_k$);

e12) a first complex sign extractor (212) for forming a first complex sign value ($Y_{k'}$)

whose real and imaginary part is −1 when the real part and the imaginary part of said complex QAM data value ($Y_k$) is respectively negative, whose real and imaginary part is 0 when the real part and the imaginary part of said complex QAM data value ($Y_k$) is respectively negative, and whose real and imaginary part is +1 when the real part and the imaginary part of said complex QAM data value ($Y_k$) is respectively positive;

e13) a second complex sign extractor (213) for forming a second complex sign value ($e_{k'}$)

whose real and imaginary part is −1 when the real part and the imaginary part of said complex error value ($e_k$) is respectively negative, whose real and imaginary part is 0 when the real part and the imaginary part of said complex error value ($e_k$) is respectively negative, and whose real and imaginary part is +1 when the real part and the imaginary part of said complex error value ($e_k$) is respectively positive;

e14) a first multiplier (216) for forming a third sign value ($e_{k''}$) by multiplying said first complex sign value ($y_{k'}$) with said second complex sign value ($e_{k'}$);

e15) a second multiplier (214, 217) for forming a quadrant determining value (0, ±1) by multiplying the real part (±1) of said first complex sign value ($Y_{k'}$) with the imaginary part (±1) of said first complex sign value ($Y_{k'}$), said quadrant determining value indicating the quadrant in the complex plane where said complex QAM data value is located; and e16) a third multiplier (215, 218) for forming said phase rotation direction value by multiplying the real part (215) of said of said third complex sign value ($e_{k''}$) with said quadrant determining value.

21. A system according to claim 16, characterized in that said average phase rotation direction determining means (219) comprises an adder (219) which outputs as said average phase rotation direction value ($d_k$) a sum of all phase rotation direction values divided by the number of complex QAM data values.

22. A system according to claim 17, characterized in that said average data symbol phase rotation direction determining means (20) is a low pass filter of a phase-locked loop (20) used for adjusting a phase of said receiver clock generator (NCO, 15).

23. A system according to claim 16, characterized in that said phase rotation direction value has a value +1, when said phase rotation of said complex QAM data value is in a counterclockwise direction from said decoded complex default QAM data value, said phase rotation direction value has a value 0, when no phase rotation of said complex QAM data value with respect to said decoded complex default QAM data value exists and said phase rotation direction value has a value −1, when said phase rotation of said complex QAM data value is in a clockwise direction with respect to said decoded complex default QAM data value.

24. A system according to claim 16, characterized in that said time-domain/frequency domain conversion means (10) comprises a Fourier transform means (FFT) for performing a Fourier Transform on said time-domain multicarrier QAM signal (DS) wherein said frequency-domain/time domain conversion means (10) comprises a Inverse Fourier transform means (FFT) for performing an Inverse Fourier Transform on said frequency-domain multicarrier QAM signal (DS).

25. A system according to claim 16, characterized in that in said receiver a weighting means is provided for weighting each of said phase rotation direction values with a weighting factor.

26. A system according to claim 25, characterized in that said weighting means calculates a SNR ratio for each carrier and said weighting factor depends on said calculated SNR ratio.

27. A method in a multicarrier QAM system for receiving and demodulating an analog multicarrier QAM signal (TM) into a digital output signal ($R_x$) consisting of successive digital data symbols, comprising the following steps:
  a) converting said analog multicarrier QAM signal (TM) into a digital time-domain multicarrier QAM signal (DS) using a predetermined sample frequency ($f_{sampR}$) from a receiver clock generator (NCO, 15);
  b) converting said digital time-domain multicarrier QAM signal (DS) into a digital frequency-domain multicarrier QAM signal consisting of a plurality of complex QAM data values ($Y_1, Y_2 \ldots Y_k; Y_{00}, Y_{01}, Y_{10}, Y_{11}$);
  c) selecting respectively a complex default QAM data value ($C_k, C_{00}, C_{01}, C_{10}, C_{11}$) representing a known digital data symbol (00, 01, 10, 11) on the basis of said complex default QAM data values said complex default QAM data values and decoding said complex default QAM data values into said digital output signal; and
  d) adjusting a phase of said receiver clock generator (NCO, 15) such that the sample timing used in said analog/digital conversion step coincides with that ($f_{sampT}$) used in a transmitter (1–6) which generates said multicarrier QAM signal; characterized by the following steps:
  e1) determining respectively a plurality of phase rotation direction values (−1, +1, 0; di, $d_2$, $d_3$, $d_k$) of a respective complex QAM data value ($Y_k$) with respect to a corresponding complex default QAM data value; and
  e2) determining an average phase rotation direction value ($d_k$) by averaging all respective phase rotation direction values; and f) adjusting said phase of said sample frequency ($f_{sampR}$) on the basis of said average phase rotation direction value ($d_k$).

28. A method according to claim 27, characterized in that the plurality of phase rotation direction values ($d_k$) correspond to the number of carriers used in the QAM system, such that said average phase rotation direction value ($d_k$) corresponds to a data symbol phase rotation direction value of all complex QAM data values for all bits of one data symbol, wherein in said step b) over time a plurality of complex QAM data values for all bits of one data symbol are successively output and wherein said average data symbol phase rotation values after each outputting of said complex QAM data values are successively averaged.

29. A method according to claim 27, characterized in that:
said analog multicarrier QAM signal (TM) contains a pilot tone (PT) corresponding to a known digital data symbol (e.g. 01), a pilot tone phase rotation direction value of a complex QAM data value ($Y_{k(PD)}$) corresponding to said received pilot tone with respect to a corresponding complex default QAM data value corresponding to said known digital data symbol of said pilot tone is determined and said phase of said sample frequency ($f_{sampR}$) is adjusted on the basis of a combining (22) of said average phase rotation direction value (D2) and said pilot tone phase direction value (D1).

30. A method according to claim 29, characterized in that in said combining step (22) a weighted sum of said average phase rotation direction value (D2) and said pilot tone phase direction value (D1) is calculated.

31. A method according to claim 27, characterized by the following steps:
  e11) calculating a complex error value ($e_k$) by subtracting said complex QAM data value ($Y_k$) from said corresponding complex default QAM data value ($C_k$);
  e12) forming a first complex sign value ($Y_{k'}$)
    whose real and imaginary part is −1 when the real part and the imaginary part of said complex QAM data value ($Y_k$) is respectively negative,
    whose real and imaginary part is 0 when the real part and the imaginary part of said complex QAM data value ($Y_k$) is respectively negative, and
    whose real and imaginary part is +1 when the real part and the imaginary part of said complex QAM data value ($Y_k$) is respectively positive;
  e13) forming a second complex sign value ($e_{k'}$)
    whose real and imaginary part is −1 when the real part and the imaginary part of said complex error value ($e_k$) is respectively negative,
    whose real and imaginary part is 0 when the real part and the imaginary part of said complex error value ($e_k$) is respectively negative, and
    whose real and imaginary part is +1 when the real part and the imaginary part of said complex error value ($e_k$) is respectively positive;
  e14) forming a third sign value ($e_{k''}$) by multiplying said first complex sign value ($Y_{k'}$) with said second complex sign value ($e_{k'}$);
  e15) forming a quadrant determining value (0, ±1) by multiplying the real part (+1) of said first complex sign value ($Y_{k'}$) with the imaginary part (±1) of said first complex sign value ($Y_{k'}$), said quadrant determining value indicating the quadrant in the complex plane where said complex QAM data value is located; and e16) forming said phase rotation direction value by multiplying the real part (215) of said of said third complex sign value ($e_{k''}$) with said quadrant determining value.

32. A method according to claim 27, characterized in that:
said average phase rotation direction value ($d_k$) is determined as a sum of all phase rotation direction values divided by the number of complex QAM data values.

33. A method according to claim 28, characterized in that
said average data symbol rotation direction value (D) is determined by a low pass filter of a phase-locked loop (20) used for adjusting a phase of said receiver clock generator (NCO, 15).

34. A method according to claim 27, characterized in that
said phase rotation direction value has a value +1, when said phase rotation of said complex QAM data value is in a counterclockwise direction from said decoded complex default QAM data value, said phase rotation direction value has a value 0, when no phase rotation of said complex QAM data value with respect to said decoded complex default QAM data value exists and said phase rotation direction value has a value −1, when said phase rotation of said complex QAM data value is in a clockwise direction with respect to said decoded complex default QAM data value.

35. A method according to claim 27, characterized in that
said conversion step b) comprises applying a Fourier transform (FFT) to said time-domain multicarrier QAM signal (DS).

36. A method according to claim 27, characterized in that
each of said phase directions is weighted with a weighting factor.

37. A method according to claim 36, characterized in that
a SNR ratio is calculated for each carrier and said weighting factor depends on said calculated SNR ratio.

* * * * *

UNITED STATES PATENT AND TRADEMARK OFFICE
CERTIFICATE OF CORRECTION

PATENT NO. : 6,310,926 B1
DATED : October 30, 2001
INVENTOR(S) : Tore Mikael André

It is certified that error appears in the above-identified patent and that said Letters Patent is hereby corrected as shown below:

<u>Title page,</u>
Item [75], the inventor should read:
-- [75] Inventor: Tore Mikael André --

Signed and Sealed this

Twenty-fifth Day of June, 2002

Attest:

JAMES E. ROGAN
Attesting Officer
Director of the United States Patent and Trademark Office